United States Patent
Awata

(10) Patent No.: US 7,280,071 B2
(45) Date of Patent: Oct. 9, 2007

(54) METHOD AND APPARATUS FOR COMPUTING POSITION AND VELOCITY OF RECEIVER USING INDEPENDENTLY-DERIVED SETS OF SATELLITES

(75) Inventor: Hideki Awata, Gunma (JP)

(73) Assignee: Sony Corporation, Tokyo (JP)

(*) Notice: Subject to any disclaimer, the term of this patent is extended or adjusted under 35 U.S.C. 154(b) by 40 days.

(21) Appl. No.: 11/191,351

(22) Filed: Jul. 28, 2005

(65) Prior Publication Data

US 2006/0022868 A1    Feb. 2, 2006

(30) Foreign Application Priority Data

Jul. 30, 2004  (JP) .......................... P2004-222917

(51) Int. Cl.
    *H04B 7/185*  (2006.01)
(52) U.S. Cl. ................................. 342/357.15
(58) Field of Classification Search ..............................
    342/357.01–357.15
    See application file for complete search history.

(56) References Cited

U.S. PATENT DOCUMENTS

| | | | | |
|---|---|---|---|---|
| 5,323,163 A | * | 6/1994 | Maki | 342/357.15 |
| 5,583,774 A | * | 12/1996 | Diesel | 701/200 |
| 6,433,731 B1 | * | 8/2002 | Sheynblat et al. | 342/357.06 |
| 6,704,650 B1 | * | 3/2004 | Fuller et al. | 701/213 |
| 6,917,330 B2 | * | 7/2005 | Ohmura et al. | 342/357.15 |
| 2003/0008666 A1 | * | 1/2003 | Ohmura et al. | 455/456 |
| 2003/0187576 A1 | * | 10/2003 | Sanmiya et al. | 701/213 |
| 2003/0231704 A1 | * | 12/2003 | Tanaka et al. | 375/150 |

FOREIGN PATENT DOCUMENTS

| | | | |
|---|---|---|---|
| JP | 3 28784 | | 2/1991 |
| JP | 6 18646 | | 1/1994 |
| JP | 7 306253 | | 11/1995 |
| JP | 8 160119 | | 6/1996 |
| JP | 8 334338 | | 12/1996 |
| JP | 9 5417 | | 1/1997 |
| JP | 2003 258769 | | 9/2003 |
| JP | 2003-258769 | * | 9/2003 |
| JP | 2004 45126 | | 2/2004 |
| JP | 2004 85349 | | 3/2004 |

OTHER PUBLICATIONS

Jun Tsuchiya, other one person, "basis of new GPS measurement", corporate judicial person Japan survey association, Sep. 30, 2002, pp. 84-89.

* cited by examiner

*Primary Examiner*—Thomas H. Tarcza
*Assistant Examiner*—Shelley Chen
(74) *Attorney, Agent, or Firm*—Frommer Lawrence & Haug LLP; William S. Frommer; Thomas F. Presson

(57) ABSTRACT

A satellite-signal reception-processing apparatus for receiving signals, which each have completed a spectrum-spreading process using a spreading code, from a plurality of artificial satellites. Then, on the basis of the received signals, the apparatus computes its own position and velocity. The apparatus includes a position-computation satellite determination section for searching for a set of specific artificial satellites each having its locus known and the time of transmission of its spreading code also known, using this set to compute the position of the apparatus. The apparatus also includes a velocity-computation satellite determination section for searching for a set of particular artificial satellites each having its locus known and the frequency of its carrier determined to be a stable frequency, and using this set to compute the velocity of the apparatus.

13 Claims, 11 Drawing Sheets

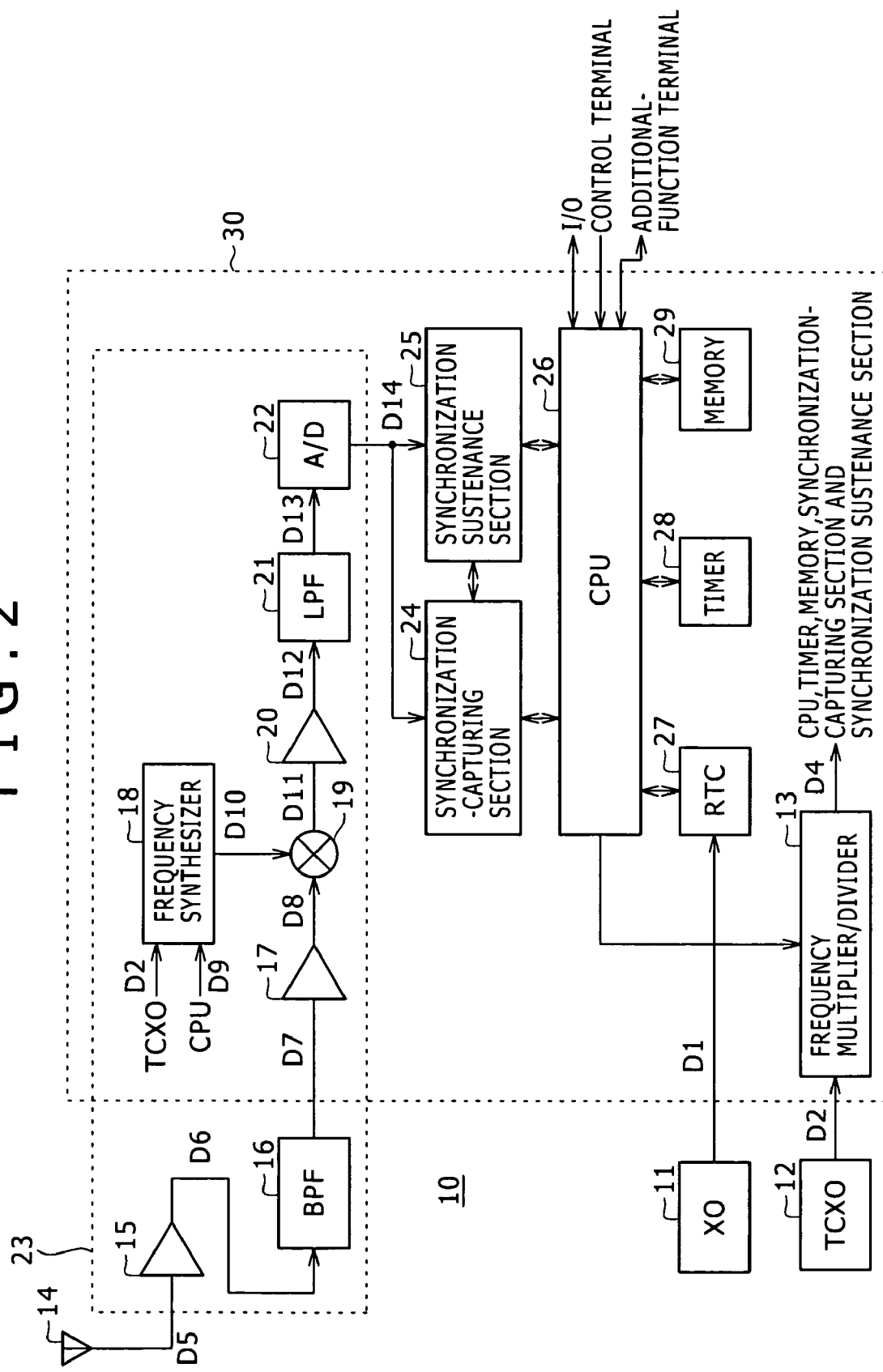

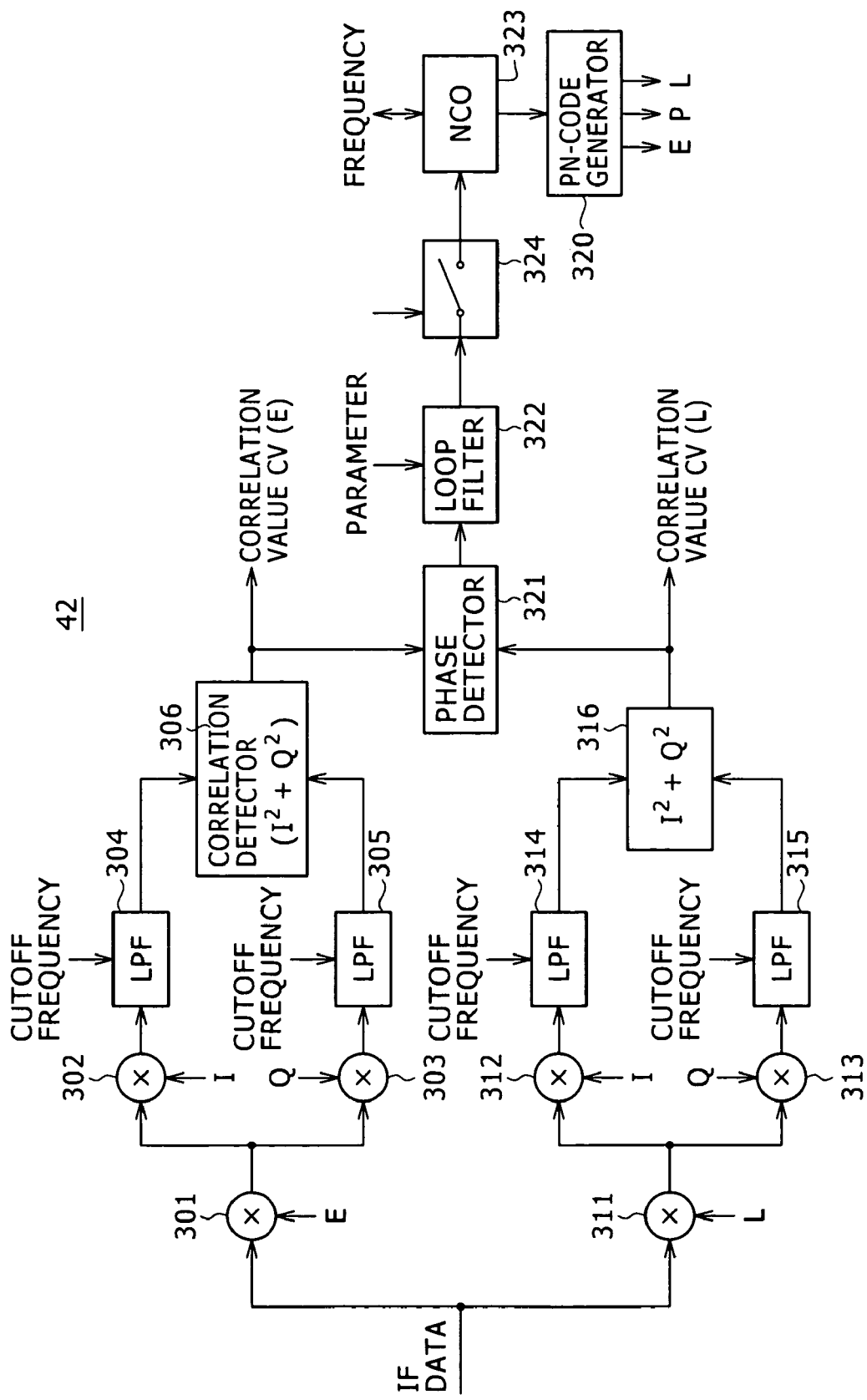

FIG. 9

$$A = \begin{bmatrix} \alpha_1 & \beta_1 & \gamma_1 & 1 \\ \alpha_2 & \beta_2 & \gamma_1 & 1 \\ \alpha_3 & \beta_3 & \gamma_3 & 1 \\ \alpha_4 & \beta_4 & \gamma_4 & 1 \end{bmatrix} \quad \text{--- (EQ.1)}$$

WHERE
$$\alpha_i = -\frac{x_i - x_0}{r_i}$$

$$\beta_i = -\frac{y_i - y_0}{r_i}$$

$$\gamma_i = -\frac{z_i - z_0}{r_i}$$

$$r_i = \sqrt{(x_i - x_0)^2 + (y_i - y_0)^2 + (z_i - z_0)^2}$$

$(x_i, y_i, z_i)$ : COORDINATES OF ith SATELLITE ($1 \leq i \leq 4$)
AND
$(x_0, y_0, z_0)$ : COORDINATES OF GPS RECEIVER.
NEXT, PDOP IS FOUND AS FOLLOWS:
IN DIAGONAL ELEMENTS $b_{ii}$ OF MATRIX $B = (A^T A)^{-1}$,
WHERE $b_{11} = X$ (EQ.2)
$b_{22} = Y$ (EQ.3)
$b_{33} = Z$ (EQ.4) AND
$b_{44} = T$ (EQ.5), $$PDOP = \sqrt{(X + Y + Z)} \quad \text{(EQ.6)}$$

WHERE NOTATION $A^T$ DENOTES TRANSPOSED MATRIX OF MATRIX A AND NOTATION $A^{-1}$ DENOTES INVERSE MATRIX OF MATRIX A.

METHOD AND APPARATUS FOR COMPUTING POSITION AND VELOCITY OF RECEIVER USING INDEPENDENTLY-DERIVED SETS OF SATELLITES

BACKGROUND OF THE INVENTION

The present invention relates to a satellite-signal reception-processing apparatus included in a GNSS (Global Navigation Satellites System) such as a GPS (Global Positioning System) as an apparatus for receiving signal electric waves from a plurality of artificial satellites and finding the position and velocity of the apparatus, and relates to a satellite-signal reception-processing method adopted in the apparatus.

In a GNSS such as a GPS for measuring the position of a moving body by making use of artificial satellites each referred to hereafter simply as a satellite, a GSP receiver serving as a satellite-signal reception-processing apparatus has a function for receiving signals from four or more satellites and computing the position and velocity the receiver itself from the received signals. In addition, the GSP receiver also has a function for notifying the user of the computed position and velocity.

In the GPS system, a signal received from a satellite is a signal spread into a spectrum by a spreading code referred to as a C/A (Clear and Acquisition) code. The C/A code is a code pertaining to a PN (pseudo random noise) system with a transmission signal velocity (a chip rate) of 1.023 MHz and a code length of 1023. The C/A code is a spreading code typically composed of a gold code. The code of the PN system to which the C/A code pertains varies from satellite to satellite.

A signal received from a satellite is a signal obtained as a result of a BPSK (Binary Phase Shift Keying) modulation process carried out on a carrier having a frequency of 1575.42 MHz by using a signal spread into a spectrum by using a spreading code. In the following description, a signal received from a satellite is also referred to as a satellite signal.

As described in Japanese Patent Laid-open No. 2003-258769, a GPS receiver receives such a satellite signal from a satellite, demodulates the received satellite signal to obtain a navigation message including an almanac (information on times) and an ephemeris (information on the locus of a satellite). The GPS then stores the navigation message including these pieces of information in a memory.

Then, the GPS receiver finds the three-dimensional position of its own from the information on times, the locus of each satellite and a delay time incurred by each satellite signal by solving simultaneous equations. The delay time incurred by a satellite signal is defined as a difference between the time of an arrival of the satellite signal at the GPS receiver and the time of a transmission of the satellite signal from the satellite. To put it in detail, the GPS receiver computes the positions of four or more satellites and pseudo distances to the satellites from the loci of the satellites, times of transmissions of spreading codes for signals received from the satellites and times of arrivals of the spreading codes. In this case, the position of any specific one of the satellites is a position at which the specific satellite is located at the time of a transmission of a spreading code for a signal received from the specific satellite. On the other hand, the pseudo distance to any specific one of the satellites is a distance to a position at which the specific satellite is located at the time of a transmission of a spreading code for a signal received from the specific satellite. The GPS receiver then establishes the simultaneous equations involving the three-dimensional coordinates of the position of the GPS receiver as well as four or more time errors between the GPS receiver and satellites as unknown variables to be found from the equations.

Signals received from four or more satellites are required for the purpose of positioning because an error in internal time between the GPS receiver and each of the satellites exists and it is necessary to get rid of effects of the error. It is to be noted that, in this specification, the positioning includes not only a computation of the position of the GPS receiver, but also a calculation of the velocity of the receiver.

Each equation of the simultaneous equations is a quadratic equation not including a term of a product of different unknown variables. In general, by giving a proper initial value close to each solution to the simultaneous equations for each solution and applying an iteration method such Newton's method, the equations can be solved. In accordance with Newton's method, a given equation is subjected to locally linear approximation at an initial value close to a solution to the equation. The linear simultaneous equations obtained as a result of the approximation using the initial values are solved first to produce tentative solutions. Then, the tentative solutions are used as next initial values. This operation is carried out iteratively. As differences between the present solutions and the immediately preceding solutions are each converged to a value smaller than a predetermined error, the present solutions are taken as final solutions to the simultaneous equations.

In addition, the GPS receiver finds not only the three-dimensional position of its own and a time, but also the three-dimensional velocity of its own by computing a Doppler frequency of the carrier transmitted by each of the four or more satellite signals. A Doppler effect is also observed in a C/A code. In order to satisfy desired precision of the three-dimensional velocity being found, however, the Doppler frequency is generally used.

To put it in detail, the GPS receiver computes the positions of four or more satellites and velocities of the satellites from the loci of the satellites and times of transmissions of spreading codes for signals received from the satellites. In addition, by using a position found as described earlier as the position of the GPS receiver and using the frequency of a carrier transmitted by each of the satellites, the GPS receiver then establishes simultaneous equations involving the three-dimensional velocity of the GPS receiver and intermediate-frequency carrier errors as unknown variables to be found from the equations. In this case, the frequency of a carrier transmitted by each of the satellites is a frequency obtained from a synchronization sustenance section as a frequency in a stable state.

Normally, in a process carried out by the GPS receiver to compute its own position and velocity, first of all, visible satellites are picked out. If no loci have been stored in the GPS receiver, electric waves received from all satellites are searched for receivable ones. The receivable electric waves are each treated as a wave received from a visible satellite. If loci have been stored in the GPS receiver, on the other hand, any satellites existing above the horizon in accordance with calculation based on the loci are each picked out as a visible satellite.

Then, for a signal received from each visible satellite, the GPS receiver carries out processing to sustain synchronizations of the spreading code and the carrier wave. Subsequently, the GPS receiver computes its own position and velocity by using signals received from satellites for which the synchronizations can be sustained. However, not all signals received from all satellites for which the synchronizations can be sustained are used to compute the position and velocity of the GPS receiver. That is to say, only signals received from specific satellites for which the synchronizations can be sustained are used. The specific satellites are satellites, the signals received from which can be used to compute the position and velocity of the GPS receiver with at least a predetermined degree of precision.

The GPS receiver in related art identifies a set including a plurality of satellites each satisfying all three conditions listed below as a set of satellites usable for computing the position and velocity of the GPS receiver. The three conditions are listed as follows:

(a) its locus is already known;
(b) the time of a transmission of its spreading code is already known; and
(c) the frequency of its carrier is already known as a stable frequency.

Next, a combination of four or more satellites is picked out from the set of satellites usable for computing the position and velocity of the GPS receiver. The satellites picked out from the set are satellites presumed to be those from which the position and velocity of the GPS receiver can be computed with a degree of precision exceeding a predetermined threshold value. In general, for the process to pick out a combination of four or more satellites from the set of satellites usable for computing the position and velocity of the GPS receiver, as a precision indicator showing the effect of the location of a satellite on the precision, a DOP (Dilution Of Precision) value is used.

That is to say, the GPS receiver finds a DOP value for a combination of four or more satellites to be used for computing the position and velocity of the GPS receiver. If the found DOP value is found equal to or smaller than a threshold value determined in advance, the GPS receiver computes the position and velocity of its own. If the found DOP value is found greater than the threshold value determined in advance so that the precisions of the position and the velocity would deteriorate, on the other hand, the GPS receiver cancels the computations of the position and the velocity. In this case, the threshold value of the DOP value is common to the computations of the position and the velocity.

It is to be noted that, in either the computation of the position or the computation of the velocity, if solutions to simultaneous quations for five or more satellites can be found, as is generally known, solutions to linear simultaneous equations are found as solutions giving a minimum sum of squared errors. That is to say, in general, the greater the number of satellites to be used for computing the position and velocity of the GPS receiver, the higher the degrees of precision.

SUMMARY OF THE INVENTION

As described above, a set of satellites used in the computation of the position and velocity of the GPS receiver itself satisfies all conditions (a) to (c) described above. The GPS receiver in related art searches satellites satisfying all conditions (a) to (c) described above for a specific group of satellites. The specific group of satellites satisfies a threshold-value condition of a precision indicator based on a DOP value. In addition, the satellites pertaining to the group are each a satellites presumed to be those from which the position and velocity of the GPS receiver can be computed with a high degree of precision. If such a group of satellites can be found, a positioning process is carried out and a result of the processing is output.

As conditions for determining a set of satellites used for computing the position of the GPS receiver, conditions (a) to (c) described above do not have to be all satisfied by satellites being searched for by the GPS receiver. That is to say, only the following two conditions need to be satisfied by satellites:

(a) its locus is already known; and
(b) the time of a transmission of its spreading code is already known.

In the following description, the above two conditions are referred to as computable-position conditions.

On the other hand, the following conditions are conditions for determining a set of satellites to be used in computation of the velocity of the GPS receiver:

(a) its locus is already known; and
(c) the frequency of its carrier is already known as a stable frequency.

That is to say, the satellites to be used in computation of the velocity of the GPS receiver need to satisfy the above two conditions, which are referred to as hereafter as computable-velocity conditions.

Thus, in order to compute both the position and velocity of a GPS receiver, a set of satellites satisfying the computable-position conditions and the computable-velocity conditions needs to be picked up. Then, the position and the velocity can be computed on the basis of information obtained from the synchronization sustenance section as information on the satellites.

As described above, in a process carried out by the GPS receiver in related art to compute the position and velocity of its own, a set of satellites each satisfying all conditions (a) to (c) is determined as a set of satellites to be used in the computations. Thus, the satellites each satisfy the computable-position conditions and the computable-velocity conditions.

In the GPS receiver in related art, a set of satellites each satisfying the computable-position conditions is picked up not separately from a set of satellites each satisfying the computable-velocity conditions because the sensitivity demonstrated by the GPS receiver in related art as a sensitivity to capture and hold a signal transmitted by a satellite is low so that a satellite satisfying the computable-position conditions also satisfies the computable-velocity conditions.

That is to say, since the synchronization sensitivity exhibited by the GPS receiver as a sensitivity for sensing synchronization of a satellite signal is low, a set of satellites each satisfying the computable-position conditions coincides with a set of satellites each satisfying the computable-velocity conditions as shown in FIG. 1A where symbol P denotes a set of satellites each satisfying the computable-position conditions and symbol V denotes a set of satellites each satisfying the computable-velocity conditions. In other words, since the synchronization sensitivity exhibited by the GPS receiver as a sensitivity for sensing synchronization of a satellite signal is low, an equation of P=V holds true. In this case, an equation of P∩V=P=V holds true, that is, an equation of |P∩V|=|P|=|V| holds true. Thus, the usable satellites can be utilized to the utmost extent in the computations of the position and the velocity. It is to be noted that notation |A| denotes the number of elements pertaining to a finite set A.

However, the above conditions are satisfied only at a location having few obstructions shielding the GPS receiver from electric waves transmitted by GPS satellites. Examples of such a location are a position on the surface of a sea and suburbs. At a location having a large number of obstructions shielding the GPS receiver from electric waves transmitted by GPS satellites or at a place similar to such a location such as buildings and/or high-rise constructions, on the other hand, an operation to keep track of the frequencies of the carriers of few electric waves passing through a space between such shielding obstructions is too slow so that a condition included in the computable-velocity conditions, which requires that the frequency of its carrier be already known as a stable frequency, is no longer satisfied. As a result, the set P of satellites each satisfying the computable-position conditions no longer coincides with the set V of satellites each satisfying the computable-velocity conditions as shown in FIG. 1B. That is to say, it is quite within the bounds of possibility that a relation of V⊂P holds true.

In a process to compute a position and a velocity on the basis of information received from satellites pertaining to a set satisfying both the computable-position conditions and the computable-velocity conditions, that is, satellites included in a set of (P∩V) as is the case with a process carried out by the GPS receiver in related art, a relation of |P∩V|≦|P|, which implies that it is quite within the bounds of possibility that a satellite cannot be used in the computation of a position only because the satellite does not satisfy a computable-velocity condition in spite of the fact that the satellite satisfies the position-velocity conditions from the beginning.

In particular, for |P|=4, a relation of |P∩V|≦4 holds true. In this case, the GPS receiver in related art raises a problem that it is quite within the bounds of possibility that the number of satellites usable for positioning computations becomes three or even a value smaller than three in dependence on how satellites satisfy the conditions. Thus, the positioning computation cannot be carried out with a high degree of precision. It is also quite within the bounds of possibility that the number of satellites usable for positioning computations even becomes two or even a value smaller than two. In this case, the positioning computations themselves cannot be carried out at all.

In addition, the sensitivity of the contemporary GPS receiver has been becoming higher and higher. In consequence, there is a situation in which the set P of satellites each satisfying the computable-position conditions no longer coincides the set V of satellites each satisfying the computable-velocity conditions as shown in FIGS. 1B and 1C.

That is to say, in order to satisfy condition (b) included in computable-position conditions as a condition stating "The time of a transmission of its spreading code is already known," it is not necessary to strictly satisfy condition (c) included in computable-velocity conditions as a condition stating "The frequency of its carrier is already known as a stable frequency." This is because a variation in spreading-code frequency is about 1/1000 or smaller than 1/1000 of the carrier-frequency variation of a signal received from a satellite. That is to say, this is because the chip rate of the spreading signal/the frequency of the RF carrier=1.023 MHz/1575.42 MHz=1/1540.

Thus, if the sensitivity of the contemporary GPS receiver increases, there is a situation in which the set P of satellites each satisfying the computable-position conditions no longer coincides the set V of satellites each satisfying the computable-velocity conditions as shown in FIGS. 1B and 1C.

Therefore, there is a situation similar to the case of an environment having poor reception conditions described above. In such a situation, it is quite within the bounds of possibility that a satellite cannot be used in the computation of a position only because the satellite does not satisfy a computable-velocity condition in spite of the fact that the satellite satisfies the computable-position conditions from the beginning. It is thus quite within the bounds of possibility that the number of satellites usable for positioning computations decreases. Thus, such a situation raises a problem that the positioning computation cannot be carried out with a high degree of precision, or the positioning computations themselves cannot be carried out at all.

As a solution to the problems described above, the inventors of the present invention have devised a satellite-signal reception-processing apparatus intended as an apparatus capable of computing its position without regard to computable-velocity conditions provided that at least computable-position conditions are satisfied.

In order to solve the problems described above, in accordance with an embodiment of the present invention, there is provided a satellite-signal reception-processing apparatus, which each have completed a spectrum-spreading process using a spreading code, from a plurality of artificial satellites, and computing a position and velocity of the satellite-signal reception-processing apparatus on the basis of the received signals. The satellite-signal reception-processing apparatus includes:

a position-computation satellite determination section for carrying out an operation to search the artificial satellites for a set of specific artificial satellites each having its locus already known and the time of transmission of its spreading code also already known as well and designating the set found in the search operation as a set of position-computation artificial satellites to be used in computation of a position of the satellite-signal reception-processing apparatus; and a velocity-computation satellite determination section for carrying out an operation to search the artificial satellites for a set of particular artificial satellites each having its locus already known and the frequency of its carrier determined to be a stable frequency and designating the set found in the search operation as a set of velocity-computation artificial satellites to be used in computation of a velocity of the satellite-signal reception-processing apparatus.

In accordance with the satellite-signal reception-processing apparatus according to an embodiment of the present invention, all specific artificial satellites included in the set P of position-computation artificial satellites each satisfying computable-position conditions are used in computation of the position of the satellite-signal reception-processing apparatus, even for |V|<3, at least, the position of the satellite-signal reception-processing apparatus can be computed. That is to say, even in a situation wherein the satellite-signal reception-processing apparatus in related art is not capable of computing the position of its own, the satellite-signal reception-processing apparatus according to an embodiment of the present invention may be capable of computing the position of its own in some cases, contributing to improvement of a positioning rate. In addition, it is quite within the bounds of possibility that the number of artificial satellites usable in computation of a position becomes greater than that of the satellite-signal reception-processing apparatus in related art, that is, it is quite within the bounds of possibility that a relation of (|P|≧|P∩V|) holds true, contributing to improvement of the precision of a computed position.

In accordance with an embodiment of the present invention, there is provided a satellite-signal reception-processing apparatus for receiving signals from a plurality of artificial satellites for computation of a position and velocity of the satellite-signal reception-processing apparatus as signals, which each have completed a spectrum-spreading process using a spreading code of the artificial satellite, and computing a position and velocity of the satellite-signal reception-processing apparatus on the basis of the received signals. The satellite-signal reception-processing apparatus includes:

a position-computation satellite determination section for searching the artificial satellites for a set of specific artificial satellites each transmitting the signal, the spreading code and the frequency of the carrier of which have their synchronizations sustained, searching the set of specific artificial satellites for final artificial satellites whose precision indicator determined by a layout of the artificial satellites used for computation of a position of the satellite-signal reception-processing apparatus is equal to or smaller than a position-precision indicator threshold value determined in advance and computing of a position of the satellite-signal reception-processing apparatus; and a velocity-computation satellite determination section for searching the artificial satellites for a set of particular artificial satellites each transmitting the signal, the spreading code and the frequency of the carrier of which have their synchronizations sustained, searching the set of particular artificial satellites for eventual artificial satellites whose precision indicator determined by a layout of the artificial satellites used for computation of a velocity of the satellite-signal reception-processing apparatus is equal to or smaller than a velocity-precision indicator threshold value determined in advance independently of the position-precision indicator threshold value and computing of a velocity of the satellite-signal reception-processing apparatus.

In accordance with the satellite-signal reception-processing apparatus according to an embodiment of the present invention, there are two types of precision indicator threshold value, i. e., the velocity-precision indicator threshold value and the position-precision indicator threshold, which are set independently of each other. If it is possible to receive signals from a plurality of position-computation artificial satellites picked up from a set including a plurality of specific artificial satellites each transmitting the received signal completing synchronization sustenance as the final artificial satellites having a precision indicator not greater than the position-precision indicator threshold value determined in advance, a positioning computation is carried out.

By the same token, if it is possible to receive signals from a plurality of velocity-computation artificial satellites picked up from a set including a plurality of particular artificial satellites each transmitting the received signal completing synchronization sustenance as the particular artificial satellites having a precision indicator not greater than the velocity-precision indicator threshold value determined in advance, a velocity computation is carried out.

Thus, in accordance with the satellite-signal reception-processing apparatus according to an embodiment of the present invention, the velocity-precision indicator threshold value and the position-precision indicator threshold are set independently of each other and it is possible to provide a configuration in which, even if a velocity computation cannot be carried out, a positioning computation can be carried out.

In accordance with an embodiment of the present invention, it is possible to provide a configuration in which, when at least the computable-position conditions are satisfied, a position can be found without regard to the computable-velocity conditions.

BRIEF DESCRIPTION OF THE DRAWINGS

These and other objects of the present invention will be seen by reference to the description, taken in connection with the accompanying diagrams, in which:

FIG. 2 is a block diagram showing a typical configuration of a GPS receiver implemented as an embodiment of the satellite-signal reception-processing apparatus according to an embodiment of the present invention;

FIG. 8 is an explanatory diagram showing a still further partial configuration of the GPS receiver shown in FIG. 2;

FIG. 9 is a diagram showing formulas used for finding a DOP to serve as a precision indicator;

DETAILED DESCRIPTION OF THE PREFERRED EMBODIMENTS

Figure 1A:
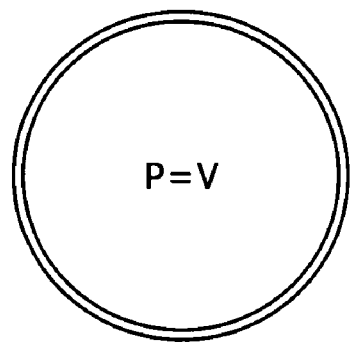
FIGS. 1A to 1C show venn-diagrams illustrating the synchronization sensitivity exhibited by a GPS receiver according to a satellite-signal reception-processing apparatus according to an embodiment of the present invention.
Figure 1B:
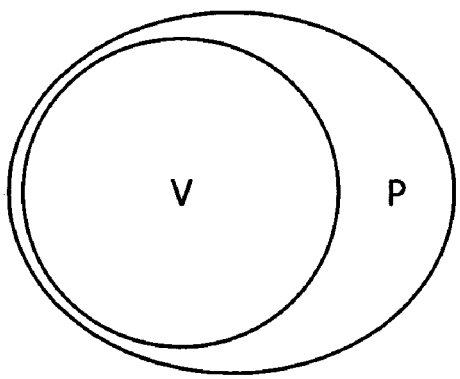
Figure 1C:
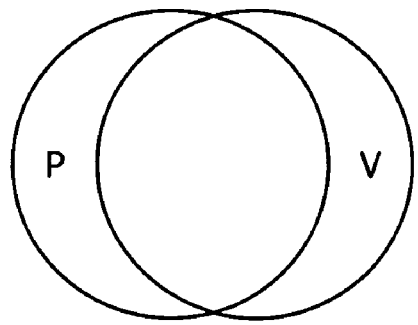

By referring to diagrams, the following description explains an embodiment implementing a satellite-signal reception-processing apparatus and a satellite-signal reception-processing method, which are provided by the present invention. To be more specific, the following description explains a case in which the present invention is applied to a satellite-signal reception-processing apparatus receiving signals transmitted by at least 4 satellites forming a GNSS (Global Navigation Satellites System) and computing the position of the satellite-signal reception-processing apparatus on the basis of the received signals. It is to be noted that, in this embodiment described below, as the GNSS, a GPS (Global Positioning System) used widely in Japan is assumed, and the embodiment thus implements a GPS receiver serving as the satellite-signal reception-processing apparatus for the GPS.

As shown in FIG. 2, the GPS receiver according to the embodiment described below has a configuration in which a function for capturing synchronization between a spreading code of a PN sequence and a spreading code of a received signal is separated away from a function for holding synchronization of a spreading code and a carrier wave, which is referred to hereafter simply as a carrier, in order to allow the operation to capture the synchronization to be carried out by a circuit with a small size at a higher speed. The PN sequence is a pseudo random noise sequence generated by the GPS receiver itself in a process to demodulate a signal received from a satellite.

However, the scope of the present invention is not limited to the application of the present invention to such a GPS receiver. It is needless to say that the present invention can also be applied to a wide range of reception apparatus each used for computing its own position by using signals transmitted by a plurality of satellites composing the GNSS and a wide range of reception methods each adopted by such a reception apparatus.

[Configuration of a GPS Receiver]

FIG. 2 is a block diagram showing a typical configuration of a GPS receiver 10 implemented by this embodiment. As shown in the figure, this typical GPS receiver 10 has a crystal oscillator 11, a temperature-compensated crystal oscillator 12 and a frequency multiplier/divider 13. Referred to hereafter simply as an XO, the crystal oscillator 11 is a component for generating an oscillation signal D1 having a predetermined oscillation frequency. Referred to hereafter simply as a TCXO, the temperature-compensated crystal oscillator 12 is a component for generating an oscillation signal D2 having a predetermined oscillation frequency FOSC different from the oscillation frequency of the oscillation signal D1 generated by the XO 11. The frequency multiplier/divider 13 is a component for multiplying or dividing the oscillation frequency FOSC of the oscillation signal D2 generated by the TCXO 12.

Typically, the XO 11 generates an oscillation signal D1 having a predetermined oscillation frequency of about 32.768 kHz. The XO 11 supplies the generated oscillation signal D1 to an RTC (Real-Time Clock) circuit 27.

On the other hand, the TCXO 12 generates an oscillation signal D2 having a predetermined oscillation frequency FOSC different from the oscillation frequency of the XO 11. For example, the oscillation signal D2 has a predetermined oscillation frequency FOSC of about 18.414 MHz. The TCXO 12 supplies the generated oscillation signal D2 to other components such as the frequency multiplier/divider 13 and a frequency synthesizer 18 to be described later.

On the basis of a control signal D3 received from a CPU (Central Processing Unit) 26 to be described later, the frequency multiplier/divider 13 multiplies the frequency of the oscillation signal D2 received from the TCXO 12 by a predetermined multiplication factor or divides the frequency at a predetermined division ratio to generate an oscillation signal D4. The frequency multiplier/divider 13 then supplies the oscillation signal D4 obtained as a result of the frequency multiplication or the frequency division to a synchronization-capturing section 24 to be described later, a synchronization sustenance section 25 to be described later, the CPU 26 mentioned above, a timer 28 to be described later and a memory 29 also to be described later.

In addition, the GPS receiver 10 also has an antenna 14, a LNA (Low Noise Amplifier) 15, a BPF (Band Pass Filter) 16, an amplifier 17, the frequency synthesizer 18 cited before, a multiplier 19, an amplifier 20, an LPF (Low Pass Filter) 21 and an A/D (Analog-to-Digital) converter 22. The antenna 14 is a component for receiving an RF (Radio Frequency) signal from a GPS satellite. The LNA 15 is a component for amplifying a received RF signal D5 output by the antenna 14. The BPF 16 is a filter for passing through signal components included in an a RF signal D6 obtained as a result of the amplification carried out by the LNA 15 as signal components in a predetermined frequency band. The amplifier 17 is a component for further amplifying an amplified RF signal D7, which has been passed through by the BPF 16 as the signal components in a predetermined frequency band. The frequency synthesizer 18 is a component for generating a local oscillation signal D10 having a predetermined frequency FLO on the basis of the oscillation signal D2 received from the TCXO 12. The multiplier 19 is a component for multiplying an amplified RF signal D8 output by the amplifier 17 as an amplification result with a predetermined frequency $F_{RF}$ by the local oscillation signal D10 received from the frequency synthesizer 18 to produce an IF (Intermediate Frequency) signal D11 having a predetermined intermediate frequency $F_{IF}$, which is a result of frequency down conversion of the multiplication carried out by the multiplier 19. The amplifier 20 is a component for amplifying the IF signal D11 to generate an amplified IF signal D12. The LPF 21 is a filter for passing through signal components included in the amplified IF signal D12 output by the amplifier 20 as signal components in a predetermined frequency band. The A/D converter 22 is a component for converting an amplified analog IF signal D13, which has been passed through by the LPF 21 as the signal components in a predetermined frequency band, into an amplified digital IF signal D14.

The antenna 14 receives a signal transmitted by a GPS satellite as an RF signal with a spread carrier having a frequency of 1,575.42 MHz. A received RF signal D5 output by the antenna 14 is supplied to the LNA 15.

The LNA 15 amplifies the received RF signal D5 output by the antenna 14 to generate an amplified RF signal D6, and then supplies the amplified RF signal D6 to the BPF 16.

The BPF 16 composes of SAW, that is, a Surface Acoustic Wave filter. The BPF 16 passes through signal components included in the RF signal D6 obtained as a result of the amplification carried out by the LNA 15 as signal components in a predetermined frequency band. An amplified RF signal D7, which has been passed through by the BPF 16 as the signal components in a predetermined frequency band, is then supplied to the amplifier 17.

The amplifier 17 further amplifies the amplified RF signal D7, which has been passed through by the BPF 16 as the signal components in a predetermined frequency band, to generate an amplified RF signal D8 having a predetermined frequency $F_{RF}$ of 1,575.42 MHz. The amplifier 17 then supplies the RF signal D8 to the multiplier 19.

The frequency synthesizer 18 generates a local oscillation signal D10 having a predetermined frequency $F_{LO}$ on the basis of the oscillation signal D2 received from the TCXO 12 in accordance with a control signal D9 received from the CPU 26. The frequency synthesizer 18 supplies the generated local oscillation signal D10 to the multiplier 19.

The multiplier 19 multiplies the amplified RF signal D8 output by the amplifier 17 as an amplification result with the predetermined frequency $F_{RF}$ by the local oscillation signal D10 received from the frequency synthesizer 18 to produce an IF (Intermediate Frequency) signal D11 having a predetermined intermediate frequency $F_{IF}$, which is a result of frequency down conversion of the multiplication carried out by the multiplier 19. The predetermined intermediate frequency $F_{IF}$ has a typical value of about 1.023 MHz. The multiplier 19 then supplies the IF signal D11 to the amplifier 20.

The amplifier 20 amplifies the IF signal D11 obtained as a result of the down-conversion process carried out by the multiplier 19 to generate an amplified IF signal D12. The amplifier 20 then supplies the amplified IF signal D12 to the LPF 21. The LPF 21 passes through signal components included in the amplified IF signal D12 output by the amplifier 20 as signal components in a lower frequency band than a predetermined frequency band. An amplified IF signal D13, which has been passed through by the LPF 21 as the signal components in a predetermined frequency band, is then supplied to the A/D converter 22.

The A/D converter 22 converts the amplified analog IF signal D13, which has been passed through by the LPF 21 as the signal components in a predetermined frequency band, into an amplified digital IF signal D14. The amplified digital IF signal D14 obtained as a result of the conversion carried out by the A/D converter 22 is supplied to a synchronization-capturing section 24 and a synchronization sustenance section 25 in bit units.

It is to be noted that the amplifiers 15, 17 and 20, the BPF 16, the frequency synthesizer 18, the multiplier 19, the LPF 21 and the A/D converter 22, which are employed as components of the GPS receiver 10, form the configuration of a frequency conversion section 23 for carrying out the down conversion process to convert the RF signal D5 received by the antenna 14 into the amplified IF signal D14 having a low frequency $F_{IF}$ of about 1.023 MHz by reducing the frequency RF of the received RF signal D5 from a high frequency of 1,575.42 MHz to the low frequency $F_{IF}$, which is a frequency allowing processing of a digital signal to be performed with ease.

In addition, the GPS receiver 10 also includes the synchronization-capturing section 24 mentioned before, the synchronization sustenance section 25 cited earlier, a CPU 26, an RTC circuit 27, a timer 28 and a memory 29. The synchronization-capturing section 24 is a unit for capturing synchronization between a spreading code generated by itself and a spreading code of the amplified IF signal D14 received from the A/D converter 22 as well as detecting the frequency of the carrier included in the amplified IF signal D14. The synchronization sustenance section 25 is a unit for sustaining synchronization of the spreading code of the amplified IF signal D14 received from the A/D converter 22 and the carrier as well as demodulating a navigation message. The CPU 26 is a unit for executing overall control of other elements and other units as well as carrying out various kinds of processing. The RTC circuit 27 is a component for measuring time on the basis of the oscillation signal D1 received from the XO 11. The timer 28 is a component serving as an internal clock to the CPU 26. The memory 29 is a storage section including a RAM (Random Access Memory) and a ROM (Read Only Memory).

In accordance with control executed by the CPU 26 and on the basis of the oscillation signal D4 received from the frequency multiplier/divider 13, the synchronization-capturing section 24 captures synchronization between a spreading code generated by itself and a spreading code of the amplified IF signal D14 received from the A/D converter 22 and, in addition, also detects the frequency of the carrier included in the amplified IF signal D14. At that time, the synchronization-capturing section 24 captures the synchronization with a relatively low degree of precision. The synchronization-capturing section 24 supplies a satellite number used for identifying each detected GPS satellite, the phase of the spreading code and the frequency of the carrier to the synchronization sustenance section 25 and the CPU 26.

By the same token, in accordance with control executed by the CPU 26 and on the basis of the oscillation signal D4 received from the frequency multiplier/divider 13, the synchronization sustenance section 25 sustains synchronization of the spreading code of the amplified IF signal D14 received from the A/D converter 22 and the carrier and, in addition, demodulates a navigation message included in the amplified IF signal D14. At that time, the synchronization sustenance section 25 starts the operations with initial values including the satellite number used for identifying each detected GPS satellite, the phase of the spreading code and the frequency of the carrier, which have been received from the synchronization-capturing section 24.

The synchronization sustenance section 25 sustains synchronization of the spreading code of the amplified IF signal D14 received from the A/D converter 22 and the carrier for each of amplified IF signals D14, which are received from a plurality of GPS satellites, in parallel. The synchronization sustenance section 25 then supplies the detected phase of the spreading code, the detected frequency of the carrier and the detected navigation message to the CPU 26.

The CPU 26 receives the phase of the spreading code, the frequency of the carrier and the navigation message from the synchronization sustenance section 25 and, on the basis of the phase of the spreading code, the frequency of the carrier and the navigation message, carries out various kinds of processing such as the processing to compute the 3-dimensional position of the GPS receiver 10 itself, the processing to compute the 3-dimensional velocity of the GPS receiver 10 itself and processing to correct time information of the GPS receiver 10. In addition, the CPU 26 also executes overall control of other sections employed in the GPS receiver 10 and a variety of peripherals also employed in the GPS receiver 10 as well as overall control of inputs and outputs exchanged with external apparatus.

The RTC circuit 27 measures the lapse of time on the basis of the oscillation signal D1 received from the XO 11. Time information obtained as a result of the measurement carried out by the RTC circuit 27 is used as a substitute for accurate time information of a GPS satellite till the accurate time information is obtained. The CPU 26 obtaining the accurate time information of a GPS satellite properly corrects the time information received from the RTC circuit 27 as a result of the measurement carried out by the RTC circuit 27 by controlling the XO 11.

The timer 28 functions as an internal clock of the CPU 26. The internal clock is used to generate a variety of timing signals required in operations carried out by a variety of sections and to reference a time. For example, the timer 28 is referenced in determining a timing to start an operation of a spreading-code generator embedded in the synchronization sustenance section 25 in the GPS receiver 10 by adjustment to the phase of a spreading code, the synchronization of which is captured by the synchronization-capturing section 24.

In the memory 29 including a RAM and a ROM, the RAM is used as a working area for a variety of processing carried out by the CPU 26 and other sections. The RAM of the memory 29 is also used as a buffer for various kinds of input data such as an almanac (or information on a time) and an ephemeris (or information on the locus of a satellite), which are received by the synchronization sustenance section 25 from a satellite. As the working area, the RAM of the memory 29 is used for storing intermediate data and final data representing a result of processing. The intermediate data is data produced in the course of the processing.

As described above, the memory 29 also includes a ROM serving as means used for storing a variety of programs and fixed data. In addition, the memory 29 may also include a non-volatile memory serving as means used for keeping other information even if the power supply of the GPS receiver 10 is turned off. The other information includes an almanac and an ephemeris, positional information obtained as a result of a positioning process and en error of the TCXO 12.

It is to be noted that, in the GPS receiver 10, the synchronization-capturing section 24, the synchronization sustenance section 25, the CPU 26, the RTC circuit 27, the timer 28 and the memory 29 compose a base-band-processing section.

In the GPS receiver 10 having the components described above, at least, it is possible to include the components except the XO 11, the TCXO 12, the antenna 14, the LNA 15 and the BPF 16 in 1 chip serving as a demodulation circuit 30.

[Configurations of the Synchronization-Capturing Section 24 and the Synchronization-Sustaining Section 25]

In the case of this embodiment, as will be described later, in the synchronization-capturing section 24, IF data generated by the frequency conversion section 23 as data having an amount corresponding to a predetermined period of time is stored in a memory. For this IF data stored in the memory, the synchronization-capturing section 24 then carries out processing of a correlation between a satellite PN code of a GPS satellite signal and a replica PN code owned by the GPS receiver 10 as a code corresponding to the satellite PN code of each GPS satellite in order to capture synchronization of the phase of a spreading code.

With regard to the process to capture synchronization of the phase of a spreading code, a method of using a matched filter is available as a method for carrying out the process to capture synchronization of the phase of a spreading code at a high speed without adopting the sliding correlation like the one described above.

By using a transversal filter, a matched filter can be realized digitally. In addition, in recent years, due to improvement of the performance of hardware represented by a DSP (Digital Signal Processor), a technique for synchronizing a spread code at a high speed can be implemented by virtue of a digital matched filter using processing referred to hereafter as an FFT (Fast Fourier Transform). However, the digital matched filter itself does not have a function to sustain the synchronization of a spreading code.

Figure 5:
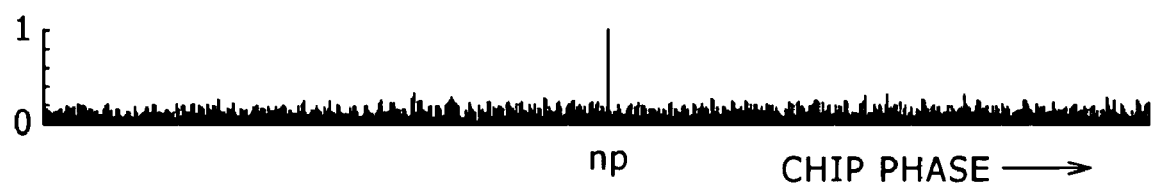
FIG. 5 shows a correlation detection output generating a peak at a correlation point with a high degree of reliability during operations carried out by the GPS receiver shown in FIG. 2.

The latter method adopting the FFT processing is based on a method known since a time in the past as a method for raising the speed of correlation computation. In accordance with this method, if a correlation exists between a replica PN code on the receiver side and a satellite PN code, the position of the peak of a correlation like the one shown in FIG. 5 is detected as a position indicating the phase of the beginning of the satellite PN code. Thus, by detecting the position of the peak of a correlation, it is possible to capture the synchronization of the satellite PN code and, hence, detect the phase of the satellite PN code in the received signal of the GPS satellite. It is to be noted that the typical correlation shown in FIG. 5 will be described later.

The carrier of the received signal transmitted from the GPS satellite has an intermediate frequency. In accordance with a method utilizing the FFT, by virtue of an operation in an FFT frequency domain, the carrier can be detected along with the phase of the satellite PN code. The phase of the satellite PN code is converted into a pseudo distance. If carriers and the phases of satellite PN codes can be detected for 4 or more satellites, the position of the GPS receiver 10 can be computed. In addition, if the frequency of each carrier is detected, the Doppler shift quantity is known so that the velocity of the GPS receiver 10 can also be computed.

As described above, in this embodiment, by virtue of a digital matched filter using processing referred to hereafter as an FFT (Fast Fourier Transform), correlation processing for a PN code can be carried out and, on the basis of the correlation processing, the processing to capture synchronization can be performed at a high speed.

A GPS satellite signal received by the antenna 14 includes signals transmitted by a plurality of GPS satellites. In the synchronization-capturing section 24, nevertheless, replica PN codes for all GPS satellites are available. By computing correlations with satellite PN codes of a plurality of GPS satellite signals usable by the GPS receiver 10 through utilization of the available replica PN codes for all GPS satellites, it is possible to capture synchronizations of the GPS satellite signals.

The synchronization-capturing section 24 recognizes a GPS satellite, the synchronization of the signal transmitted by which has been captured, from information used in the detection of the synchronization as a replica PN code for the GPS satellite. Typically, a GPS satellite number is used as an identifier for identifying the GPS satellite, the synchronization of the signal transmitted by which has been captured.

Then, the synchronization-capturing section 24 delivers a GPS satellite number used as an identifier for identifying a GPS satellite, the synchronization of the signal transmitted by which has been captured, the phase of each satellite PN code detected in the processing to capture the synchronization, the frequency of each IF carrier and, if necessary, each signal strength to the synchronization sustenance section 25. The signal strength is a correlation detection signal indicating the degree of correlation.

As a method of delivering the satellite numbers, the phases of the satellite PN codes, the IF carrier frequencies and the signal strengths, which have been detected by the synchronization-capturing section 24, there are 2 methods that can be selected after determining a data format and an interrupt technique. The 2 methods are a direct method to deliver the information from the synchronization-capturing section 24 to the synchronization sustenance section 25 directly and a method to deliver the information from the synchronization-capturing section 24 to the synchronization sustenance section 25 by way of the CPU 26.

In the case of the direct method, a DSP employed in the synchronization-capturing section 24 generates the information. As an alternative configuration, the synchronization sustenance section 25 is provided with a control section including a DSP. On the basis of the information received from the synchronization-capturing section 24, the control section generates information necessary for the synchronization sustenance section 25.

In the case of the indirect method to deliver the information from the synchronization-capturing section 24 to the synchronization sustenance section 25 by way of the CPU 26, on the other hand, the CPU 26 is capable of controlling the delivery. In addition, the CPU 26 is also capable of controlling the synchronization-capturing section 24 and the synchronization sustenance section 25 themselves. Thus, it is possible to easily carry out processing to correct the phase of a satellite PN code as will be described later and a large number of synchronization procedures according to the conditions of the synchronization-capturing section 24 and the synchronization sustenance section 25.

In the embodiment described below, the indirect method is adopted to deliver the satellite numbers, the phases of the satellite PN codes, the IF carrier frequencies and the signal strengths from the synchronization-capturing section 24 to the synchronization sustenance section 25 by way of the CPU 26.

[Configuration of the Synchronization-Capturing Section 24]

Figure 3:
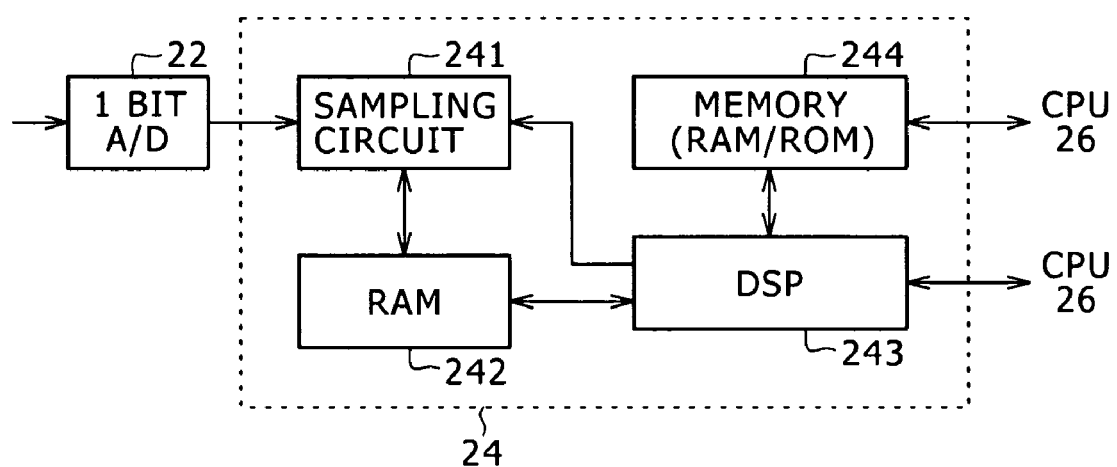
FIG. 3 is an explanatory diagram showing a partial configuration of the GPS receiver shown in FIG. 2.

FIG. 3 is a diagram showing a typical configuration of the synchronization-capturing section 24. This typical configuration includes a sampling circuit 241, a RAM (Random Access Memory) 242 used as a buffer, a DSP (Digital Signal Processor) 243 and a memory section 244. Including a program ROM (Read Only Memory) and a RAM used as a work area, the memory section 244 is a memory provided for the DSP 243. The DSP 243 and the memory section 244 for the DSP 243 are connected to the CPU 26.

The sampling circuit 241 samples IF data, which is received from the frequency conversion section 23 as data with an IF frequency of 1.023 MHz, at a predetermined frequency twice or more times the IF frequency, and stores sampled values obtained as a result of the sampling in the RAM 242. The RAM 242 has a storage capacity for storing IF data having an amount corresponding to a predetermined time length. The DSP 243 carries out a synchronization-capturing process on the sampled IF data in units each equal to the storage capacity of the RAM 242.

To put it in detail, in this embodiment, the DSP 243 carries out the synchronization-capturing process on the satellite PN code at a high speed for the IF data stored in the RAM 242 through utilization of a digital matched filter using the FFT (Fast Fourier Transform) process. As a result of the synchronization-capturing process, the DSP 243 detects the GPS satellite number used as an identifier for identifying the GPS satellite, the synchronization of the signal transmitted by which has been captured, the phase of the satellite PN code of the satellite signal transmitted by the GPS satellite and the frequency of the IF carrier.

The sampling frequency used by the sampling circuit 241 determines the precision at which the phase of the satellite PN code is detected. In accordance with a sampling theorem, the sampling frequency needs to be at least equal to twice the maximum frequency of a component included in the IF signal. It is thus desirable to set the sampling frequency at a multiple of the frequency of the IF carrier.

In addition, set by the storage capacity of the RAM 242, the time length of the processing unit of the DSP 243 determines the precision of the detection of the frequency of the IF carrier. The time length of the processing unit of the DSP 243 is equal to a multiple of the period of the PN code. As will be described later, in particular, it is desirable to set the time length of the processing unit of the DSP 243 at n times the period of the PN code where n is equal to the ith power of 2 and i is any integer.

Let us assume in this case that the sampling frequency used by the sampling circuit 241 is set at $\alpha$ times the chip rate of the spreading code and the time length of IF data stored in the RAM 242 is set at $\beta$ times the period of the PN code (or $\beta$ milliseconds). In this case, by carrying out an operation in an FFT frequency domain in the DSP 243, the phase of the satellite PN code can be detected at a precision of $1/\alpha$ chips and the frequency of the IF carrier can be detected at a precision of $1/\beta$ kHz (or $\pm 1/2\beta$ kHz).

The following description explains details of some examples of the processing carried out by the DSP 243 to capture synchronization through utilization of a digital matched filter using the FFT process.

[Examples of the Processing to Capture Synchronization through Utilization of a Digital Matched Filter]

In one of these examples, the sampling frequency used by the sampling circuit 241 is set at about 4 times the chip rate of the spreading code or at 4.096 MHz. On the other hand, data sampled at 4,096 sampling points corresponding to 1 period (or 1 millisecond) of the PN code is stored in the RAM 242. In this case, for data of a 1-millisecond unit stored in the RAM 242, the DSP 243 computes a correlation between the satellite PN code of the GPS satellite signal and the replica PN code of the GPS receiver 10 by execution of correlation processing using the FFT process in order to carry out the synchronization-capturing process. Since 1 period of the PN code is equal to 1,023 chips, the phase of the satellite PN code can be detected at a precision of ¼ chips. On the other hand, the frequency of the IF carrier can be detected at a precision of 1 kHz, which corresponds to an FFT process of a 1-millisecond unit.

Figure 4:
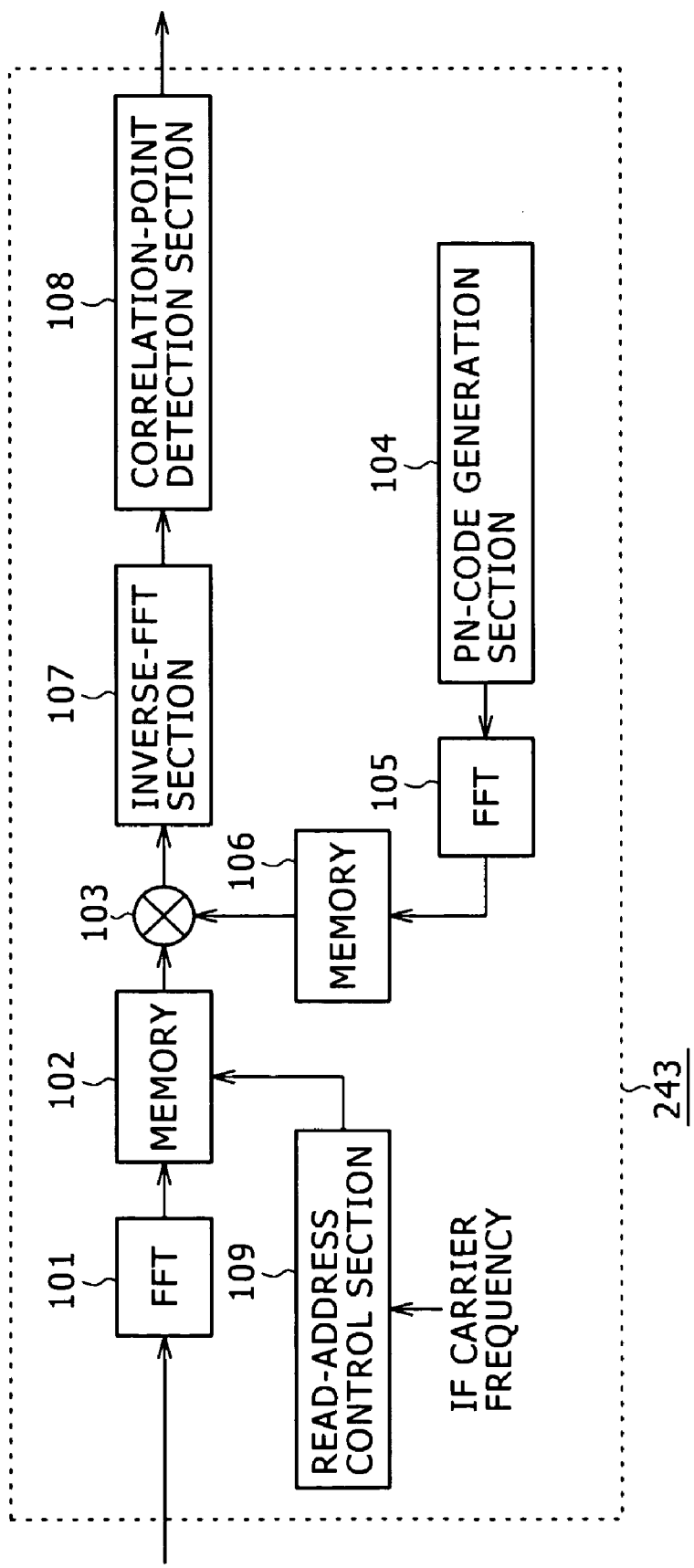
FIG. 4 is an explanatory diagram showing another partial configuration of the GPS receiver shown in FIG. 2.

In the above example, the DSP 243 reads out IF data of a 1-millisecond unit stored in the RAM 242, carries out the FFT process on the data in a FFT-processing section 101 and stores a result of the FFT process in a memory 102 as shown in FIG. 4. Then, the result of the FFT process carried out on the received signal is read out from the memory 102 and supplied to a multiplication section 103.

In the mean time, a PN-code generation section 104 generates a replica PN code considered to be the same sequence as the PN code used in the signal received from a GPS satellite. In actuality, the PN-code generation section 104 generates a plurality of replica PN code sequences prepared in advance for a plurality of respective GPS satellites by sequentially switching the generation of the sequence from one to another.

A replica PN code sequence of 1 period (=1,023 chips) is supplied from the PN-code generation section 104 to an FFT-processing section 105 for carrying out an FFT process. Results of the FFT process are supplied to a memory 106 to be stored therein. Then, the results of the FFT process are read out from the memory 106 sequentially starting with a lowest-frequency one in the same way as an ordinary case, and supplied to the multiplication section 103.

The multiplication section 103 multiplies the FFT result read out from the memory 102 as the FFT result of the received signal by the FFT result read out from the memory 106 as the FFT result of the replica PN code to find the degree of correlation between the replica PN code and the satellite PN code of the received signal in a frequency domain. In this case, in the multiplication processing carried out by the FFT-processing section 105, the discrete FFT result of the received signal and the discrete FFT result of the replica PN code are two members of a complex conjugate. Then, a product obtained as a result of the multiplication is supplied to an inverse-FFT-processing section 107 for converting the signal in the frequency domain back into the signal in the time domain.

An inverse-FFT result produced by the inverse-FFT-processing section 107 is a correlation detection signal existing in the time domain as a signal revealing a correlation between the FFT result of the received signal and the FFT result of the replica PN code. Then, this correlation detection signal is supplied to a correlation detection section 108.

The correlation detection signal is a signal showing a correlation value in each chip phase of 1 period of the spreading signal. The correlation detection signal has a waveform shown in FIG. 5. As shown in the figure, at a phase at which the spreading code of a received signal with a strength exceeding a predetermined value is synchronized with the spreading code generated by the PN-code generation section 104 (that is, at the phase of a 1-period unit of the spreading code), a correlation value in one certain phase within the 1,023 chips shows a peak value exceeding a threshold value determined in advance. A phase at which the peak value is observed is the phase of a correlation point. This phase is the phase of the beginning of 1 period of the satellite PN code in the GPS satellite signal for the replica PN code generated by the GPS receiver 10.

If the strength of the received signal does not exceed the threshold value, on the other hand, even if the spreading code of a received signal is synchronized with the spreading code generated by the PN-code generation section 104, a correlation waveform including an erected peak value as shown in FIG. 5 cannot be obtained. That is to say, in any chip phase, a peak value exceeding the threshold value determined in advance is not observed.

The correlation detection section 108 determines whether or not the satellite PN code of a received signal has been synchronized with the replica PN code in dependence on whether or not a peak value exceeding the threshold value determined in advance exists in the correlation detection signal received from the correlation detection section 108.

If the correlation detection section 108 determines that the satellite PN code of a received signal has been synchronized with the replica PN code, the phase of the peak value is detected as the correlation point, that is, the phase of the peak value is detected as the phase of the satellite PN code of the GPS satellite signal. Then, the DSP 243 identifies a GPS satellite, for which the replica PN code has been generated by the PN-code generation section 104, and determines the GPS satellite number.

The correlation detection signal shown in FIG. 5 is a signal in the time domain. The peak of the correlation is detected only for a case in which the carrier component has been correctly removed from the received IF signal in a process described later.

In addition, the frequency of the eliminated carrier component is the frequency of the IF carrier including a Doppler shift portion for a correlation point at which a peak value exceeds the threshold value determined in advance. Thus, the DSP 243 detects the frequency of the IF carrier including a Doppler shift portion as a result of detection of the correlation point.

As described above, as the processing to capture synchronization for one GPS satellite is completed, in this embodiment, the replica PN code generated by the PN-code generation section 104 is changed to a replica PN code for the satellite PN code of a signal received from another GPS satellite, and the processing described above is repeated for the other GPS satellite. Even if synchronization for a GPS satellite cannot be captured, the DSP 243 changes the replica PN code generated by the PN-code generation section 104 to a replica PN code for the satellite PN code of a signal received from another GPS satellite, and repeats the processing described above for the other GPS satellite.

As the processing carried out by the DSP 243 to capture synchronization has been completed for all GPS satellites serving as an object of a search operation or, as information received from the CPU 26 shows that, for example, synchronizations of PN codes of 4 or more GPS satellites have been established, the processing to capture synchronization is ended.

Then, the DSP 243 supplies information to the CPU 26 as a result of the processing to capture synchronization. The information includes a GPS satellite number used as an identifier for identifying each GPS satellite, the synchronization of the signal transmitted by which has been captured, the phase of each satellite PN code detected in the processing to capture the synchronization and the frequency of each IF carrier. In addition, in this embodiment, the DSP 243 also supplies the peak value of the correlation point for each signal transmitted by a GSP satellite, the synchronization of the signal transmitted by which has been captured to the CPU 26.

In the above explanation, processing of the carrier of a received signal is not described. In actuality, however, the received signal includes a carrier. In order to obtain data from a received signal, it is necessary to establish synchronization of the PN code with the carrier and eliminate the carrier from the received signal.

In this embodiment, with a simple configuration of only processing based on the FFT in the frequency domain, it is possible to establish synchronization of the PN code with a carrier (strictly speaking, an IF carrier) and eliminate the carrier from a received signal.

That is to say, FFT results produced by the FFT processing section 101 as FFT results for a signal received from a GPS satellite are normally read out from the memory 102 sequentially starting with a lowest-frequency component of the received signal and supplied to the multiplication section 103. In this embodiment, however, an FFT result at a read address for a signal received from a GPS satellite is read out from the memory 102 and, by shifting the read address in accordance with control executed by a address control section 109, FFT results are read out from the memory 102 sequentially.

The address control section 109 is capable of accurately estimating a Doppler shift quantity for a signal received from a GPS satellite. In addition, if the frequency of an IF carrier of the received signal can be obtained as a frequency detected with the local oscillation frequency of the GPS receiver 10 and its time information correctly calibrated, the IF carrier frequency (that is, the frequency of the IF carrier) is supplied to the address control section 109.

As described above, the frequency of the IF carrier can be found with almost a high degree of accuracy in computation of the velocity of the amplifier 20 when synchronizations of signals received from 4 or more GPS satellites are sustained, allowing the position of the GPS receiver 10 to be measured as a stable position. Thus, the detected frequency of IF carrier can be used. In addition, the frequency of the IF carrier can be acquired from a source external to the GPS receiver 10.

As described above, the frequency of an IF carrier can be generated internally in the GPS receiver 10 or acquired from a source external to the GPS receiver 10. Then, on the basis of the frequency of the IF carrier, the address control section 109 shifts the read address by a distance corresponding to the frequency of the IF carrier before a next FFT result of a received signal stored at a read address resulting from the shift operation is read out from the memory 102 in a sequential way and supplied to the multiplication section 103.

By sequentially reading out FFT results stored at read addresses separated away from each other by a distance corresponding to the frequency of the IF carrier from the memory 102 as described above, it is possible to obtain FFT results equivalent to FFT results of a received signal with its carrier component excluded as will be explained later. Then, by carrying out an inverse spreading process on a result of multiplying FFT results of a received signal with its carrier component excluded by an FFT result of one period of the PN code, it is possible to obtain a correlation detection output generating a peak at a correlation point with a high degree of reliability as shown in FIG. 5.

[Configuration of the Synchronization Sustenance Section 25]

In order to sustain synchronizations of signals received from a plurality of GPS satellites simultaneously in parallel, it is necessary to provide a synchronization sustenance section 25 with a configuration including as many channel synchronization sustenance sections as channels, through each of which a signal is received from one of the GPS satellites.

Figure 6:
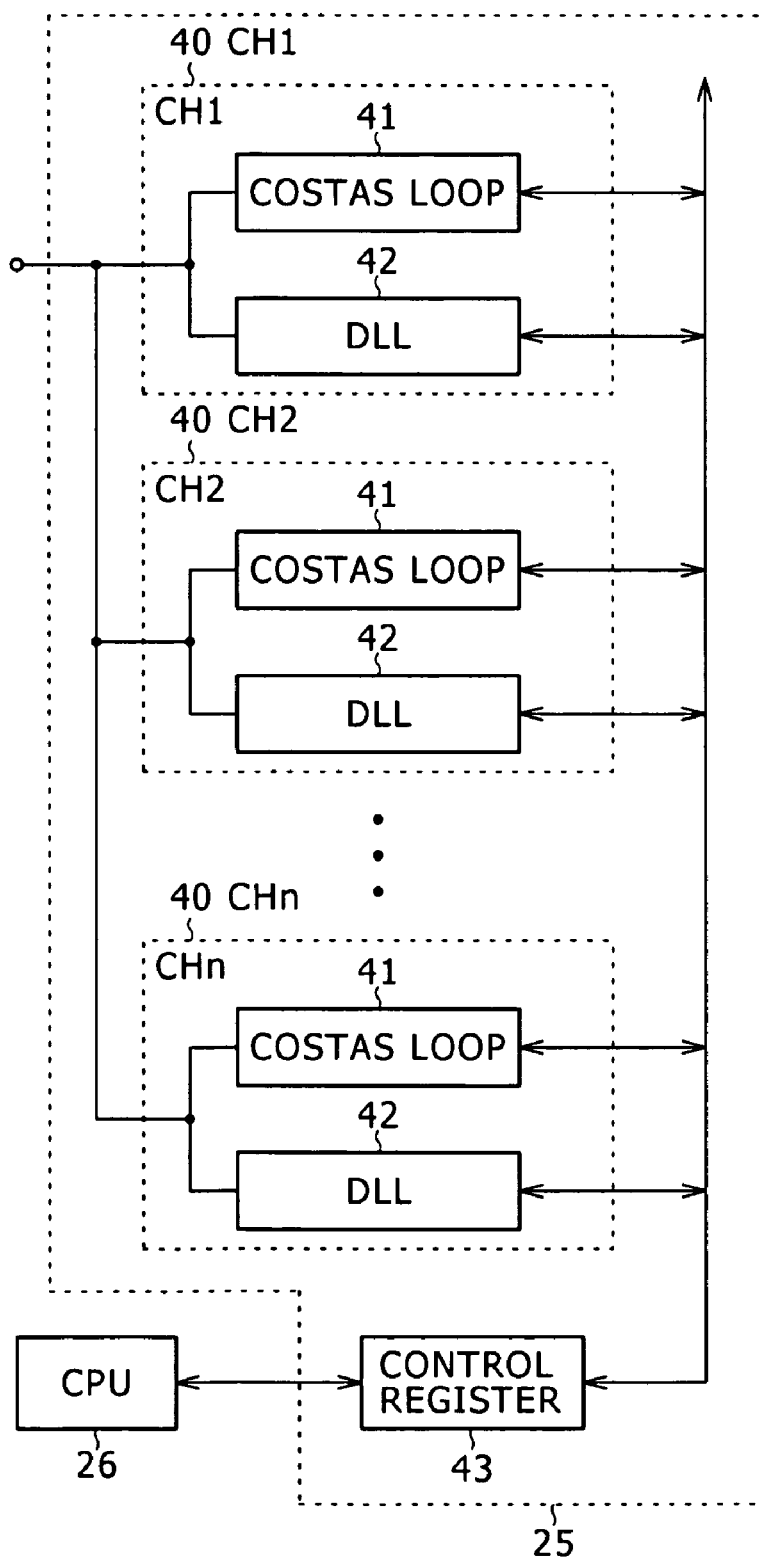
FIG. 6 is an explanatory diagram showing a further partial configuration of the GPS receiver shown in FIG. 2.

FIG. 6 is a diagram showing a typical configuration of the synchronization sustenance section 25 in the embodiment. This synchronization sustenance section 25 includes as many channel synchronization sustenance sections 40CH1, 40CH2, . . . and 40CHn as channels in addition to a control register 43. Lets us assume that there are n channels. Each of the channel synchronization sustenance sections 40CH1, 40CH2, . . . and 40CHn has a costas loop 41 and a DLL (Delay Locked Loop) 42.

The control register 43 is connected to the CPU 26. The control register 43 receives data for determining parameters of a loop filter composed of the costas loop 41 and the DLL 42 as well as characteristics of the filter from the CPU 26. The control register 43 then sets the data in a member specified by the CPU 26 as a member in a channel also specified by the CPU 26. In addition, the control register 43 also receives a correlation and a frequency from the loop filter composed of the costas loop 41 and the DLL 42, delivering the correlation and the frequency to the CPU 26 in accordance with an access made by the CPU 26.

[Configurations of the Costas Loop 41 and the DLL 42]

Figure 7:
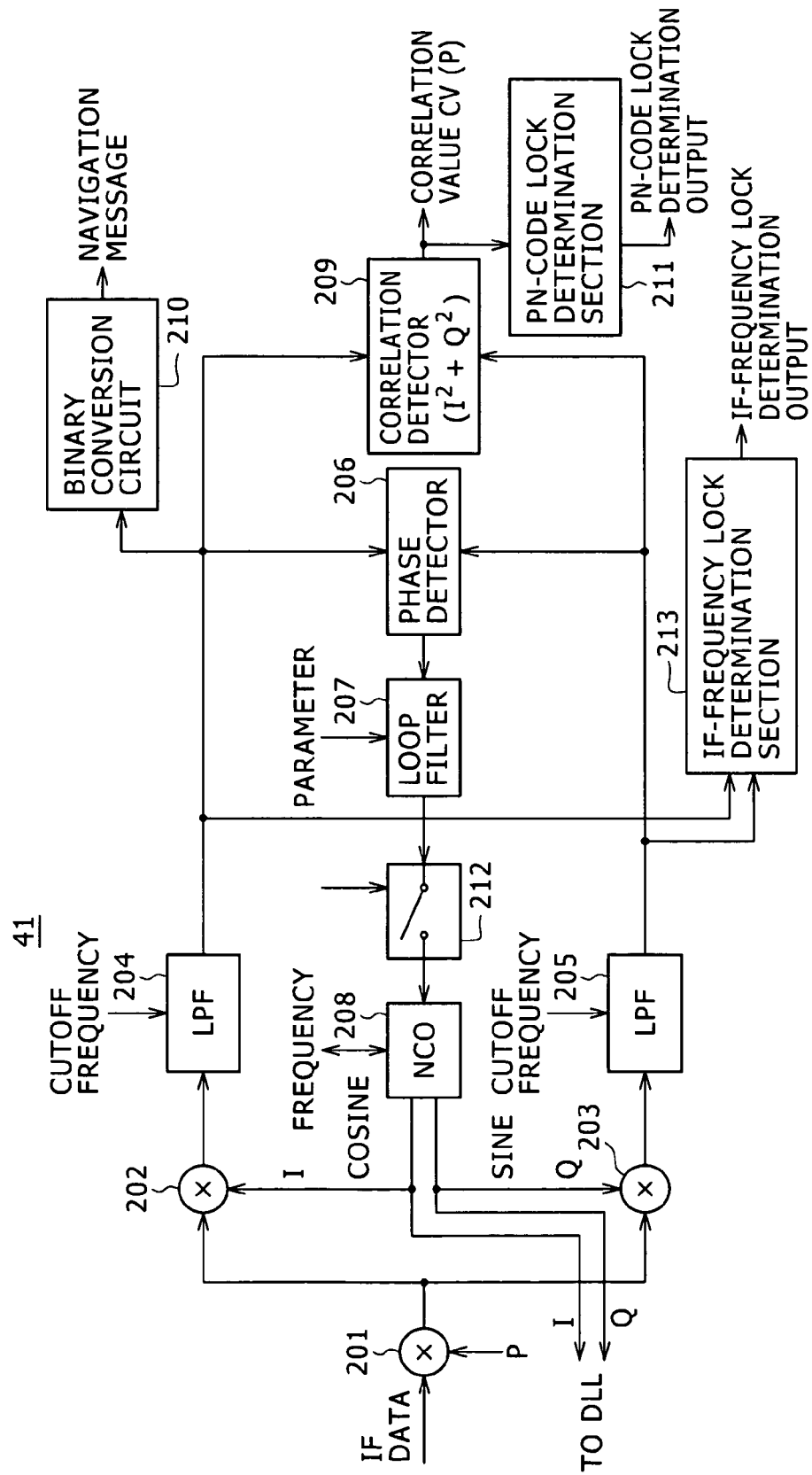
FIG. 7 is an explanatory diagram showing a still further partial configuration of the GPS receiver shown in FIG. 2.

FIG. 7 is a block diagram showing a typical configuration of the costas loop 41. On the other hand, FIG. 8 is a block diagram showing a typical configuration of the DLL 42.

The costas loop 41 is a section for sustaining synchronization of the frequency of an IF carrier and extracting transmitted data representing a navigation message. On the other hand, the DLL 42 is a section for sustaining synchronization of the phase of the satellite PN code of a signal transmitted by a GPS satellite. In addition, the costas loop 41 and the DLL 42 collaborate with each other to carry out a spectrum inverse spreading process on a signal received from each GPS satellite to obtain a signal prior to a spectrum-spreading process. Then, the costas loop 41 and the DLL 42 demodulate the signal existing at a time prior to a spectrum-spreading process to obtain a navigation message, supplying the message to the CPU 26. Operations carried out by the costas loop 41 and the DLL 42 are explained concretely as follows.

[Operations of the Costas Loop 41]

IF data output by the frequency conversion section 23 is supplied to a multiplier 201 employed in the costas loop 41 shown in FIG. 7. The multiplier 201 also receives a replica PN code from a PN-code generator 320 employed in the DLL 42 shown in FIG. 8.

The PN-code generator 320 employed in the DLL 42 generates replica PN codes with 3 different phases. The replica PN codes with 3 different phases are a prompt PN code P, an early PN code E and a late PN code L. As will be described later, the DLL 42 computes a correlation between the early PN code E and IF data as well as a correlation between the late PN code L and the IF data. Then, the phase of each replica PN code generated by the PN-code generator 320 is controlled to make the correlation between the early PN code E and the IF data equal to the correlation between the late PN code L and the IF data. In this way, the phase of the prompt PN code P matches the phase of the satellite PN code of the signal transmitted by the GPS satellite.

As described above, the multiplier 201 employed in the costas loop 41 as a component for inverse spreading also receives a prompt replica PN code P from a PN-code generator 320 for carrying out an inverse spreading process on IF data through use of the prompt replica PN code. The IF data completing the inverse spreading process carried out by the multiplier 201 is supplied to multipliers 202 and 203.

As shown in FIG. 7, the costas loop 41 includes the multipliers 202 and 203 cited above, low-pass filters 204 and 205, a phase detector 206, a loop filter 207, an NCO (Numerical Controlled Oscillator) 208, a correlation detector 209, a binary-conversion circuit 210, a PN-code lock determination section 211, a switch circuit 212 and an IF-carrier lock determination section 213.

Cut-off frequencies of the low-pass filters (LPFs) 204 and 205, parameters used for determining a characteristic of the loop filter 207 and a frequency used for determining the oscillation center frequency of the NCO 208 are set by the CPU 26 through the control register 43 on the basis of a result of a process carried out by the synchronization-capturing section 24 to capture synchronization as will be described later.

The switch circuit 212 is a component for controlling operations to open and close the loop of the costas loop 41. The switch circuit 212 is opened and closed in accordance with a switching control signal output by the CPU 26. It is to be noted that, in an initial state prior to the start of a synchronization sustenance operation, the switch circuit 212 is in a turned-off state, putting the loop in an opened state. As will be described later, when the synchronization sustenance operation is started, putting the correlation output of the correlation detector 209 employed in the costas loop 41 at a meaningful level, the switch circuit 212 is turned on to put the loop in a closed state.

As described above, a signal completing the inverse spreading process carried out by the multiplier 201 is supplied to the multipliers 202 and 203. The multiplier 202 also receives an I (cosine) signal generated by the NCO 28 as a signal with a frequency approximately equal to the frequency of the IF carrier in accordance with frequency information received from the CPU 26. By the same token, the multiplier 203 also receives an Q (sine) signal generated by the NCO 28 as a signal with a frequency approximately equal to the frequency of the IF carrier in accordance with frequency information received from the CPU 26. The Q and I signals have phases orthogonal to each other.

A product obtained as a result of the multiplication carried out by the multiplier 202 is supplied to the phase detector 206 by way of the LPF 204. By the same token, a product obtained as a result of the multiplication carried out by the multiplier 203 is supplied to the phase detector 206 by way of the LPF 205. The LPFs (low-pass filters) 204 and 205 are each a component each used for blocking noises outside the band of a signal supplied thereto in accordance with a cutoff frequency received from the CPU 26.

On the basis of the signals received from the LPFs 204 and 205, the phase detector 206 detects an error in phase between the IF carrier and a frequency signal supplied by the NCO 208, supplying the error in phase to the NCO 208 by way of the loop filter 207. The error in phase is used as a basis for controlling the NCO 208 so that the phase of the frequency signal supplied by the NCO 208 is synchronized with the phase of the IF-carrier component.

It is to be noted that, in accordance with a parameter received from the CPU 26, the loop filter 207 integrates the phase error received from the phase detector 206 to generate an NCO control signal for controlling the NCO 28. The NCO control signal controls the NCO 28 so that the phase of the frequency signal supplied by the NCO 208 is synchronized with the phase of the IF-carrier component as described above.

In addition, the signals output by the LPFs 204 and 205 employed in the costas loop 41 are also supplied to the correlation detector 209. The correlation detector 209 takes the square of the signal received from the LPF 204 and the square of the signal received from the LPF 205, finding the sum of the squares. The sum output by the correlation detector 209 represents a correlation value (CV) P between the IF data and the prompt PN code P generated by the PN-code generator 320. The correlation value (CV) P is delivered to the CPU 26 by way of the control register 43.

The signal output by the LPF 204 is also supplied to the binary-conversion circuit 210, which then generates a navigation message.

In addition, the correlation value (CV) P output by the correlation detector 209 is supplied to the PN-code lock determination section 211. The PN-code lock determination section 211 compares the correlation value (CV) P with a threshold value determined in advance. If the correlation value (CV) P is found greater than the threshold value, the PN-code lock determination section 211 outputs a PN code lock determination result indicating that the sustenance of synchronization is in a locked state. If the correlation value (CV) P is found smaller than the threshold value, on the other hand, the PN-code lock determination section 211 outputs a PN code lock determination result indicating that the sustenance of synchronization is in an unlocked state.

In this embodiment, the PN code lock determination result is supplied to the CPU 26 so that the CPU 26 is capable of determining whether the sustenance of synchronization of the PN code is in a locked or unlocked state. On the basis of the PN code lock determination result, the CPU 26 determines only whether the sustenance of synchronization of the PN code is in a locked or unlocked state. That is to say, on the basis of the PN code lock determination result, the CPU 26 is capable of determining that the synchronization of the PN code has been established but is not capable of determining whether or not the frequency of the IF carrier has been released from a locked state. The CPU 26 determines whether or not the frequency of the IF carrier has been released from a locked state on the basis of a signal output by the IF-carrier lock determination section 213.

The signals output by the LPFs 204 and 205 employed in the costas loop 41 are also supplied to the IF-carrier lock determination section 213. The IF-carrier lock determination section 213 finds the absolute values of the signals output by the LPFs 204 and 205, computing the ratio of the absolute values. Then, the IF-carrier lock determination section 213 compares the ratio to a threshold value determined in advance. If the ratio is found at least equal to the threshold value determined in advance, the IF-carrier lock determination section 213 outputs an IF-carrier lock determination result indicating that the synchronization of the frequency of the IF carrier is in a locked state. If the ratio is found smaller than the threshold value determined in advance, on the other hand, the IF-carrier lock determination section 213 outputs an IF-carrier lock determination result indicating that the synchronization of the frequency of the IF carrier is in an unlocked state.

That is to say, let us assume that the IF-carrier lock determination result indicates that the following relation holds true:

$$|I_o|/|Q_o| \geq th$$

where symbol $I_o$ denotes the signal output by the LPF 204, symbol $Q_o$ denotes the signal output by the LPF 205 and symbol th denotes the threshold value determined in advance. In this case, the IF-carrier lock determination section 213 outputs an IF-carrier lock determination result indicating that the synchronization of the frequency of the IF carrier is in a locked state.

On the other hand, let us assume that the IF-carrier lock determination result indicates that the following relation holds true:

$$|I_o|/|Q_o| < th$$

In this case, the IF-carrier lock determination section 213 outputs an IF-carrier lock determination result indicating that the synchronization of the frequency of the IF carrier is in an unlocked state.

In this embodiment, the IF-carrier lock determination result output by the IF-carrier lock determination section 213 is supplied to the CPU 26. On the basis of the IF-carrier lock determination result, the CPU 26 determines whether the frequency of the IF carrier is in a locked or unlocked state.

[DLL 42]

As shown in FIG. 8, IF data received by the DLL 42 from the frequency conversion section 23 is supplied to multipliers 301 and 311. The multiplier 301 also receives an early PN code E from the PN-code generator 320 while the multiplier 311 receives a late PN code L from the PN-code generator 320.

The multiplier 301 multiplies the IF data by the early PN code E in order to carry out a spectrum inverse spreading process, and supplies a signal obtained as a result of the spectrum inverse spreading process to the multipliers 302 and 303. The multiplier 302 also receives an I signal from the NCO 208 employed in the costas loop 41 described earlier while the multiplier 303 receives a Q signal received from the NCO 208.

The multiplier 302 multiplies the IF data obtained as a result of the spectrum inverse spreading process by the I signal received from the NCO 208, and supplies the product to a correlation detector 306 by way of an LPF 304. By the same token, the multiplier 303 multiplies the IF data obtained as a result of the spectrum inverse spreading process by the Q signal received from the NCO 208, and supplies the product to the correlation detector 306 by way of an LPF 305.

It is to be noted that the LPFs 304 and 305 each block noises outside the band of a signal supplied thereto in accordance with a cutoff frequency received from the CPU 26 as the LPFs 204 and 205 employed in the costas loop 41 do.

The correlation detector 306 takes the square of the signal received from the LPF 304 and the square of the signal received from the LPF 305, finding the sum of the squares. The sum output by the correlation detector 306 represents a correlation value (CV) E between the IF data and the early PN code E generated by the PN-code generator 320. The correlation value (CV) E is delivered to the phase detector 321 and the CPU 26 by way of the control register 43.

By the same token, the multiplier 311 multiplies the IF data by the late PN code L in order to carry out a spectrum inverse spreading process, and supplies a signal obtained as a result of the spectrum inverse spreading process to the multipliers 312 and 313. The multiplier 312 also receives an I signal from the NCO 208 employed in the costas loop 41 described earlier while the multiplier 313 receives a Q signal received from the NCO 208.

The multiplier 312 multiplies the IF data obtained as a result of the spectrum inverse spreading process by the I signal received from the NCO 208, and supplies the product to a correlation detector 316 by way of a LPF 314. By the same token, the multiplier 313 multiplies the IF data obtained as a result of the spectrum inverse spreading process by the Q signal received from the NCO 208, and supplies the product to the correlation detector 316 by way of a LPF 315. As the LPFs 304 and 305 do, the LPFs 314 and 315 each block noises outside the band of a signal supplied thereto in accordance with a cutoff frequency received from the CPU 26.

The correlation detector 316 takes the square of the signal received from the LPF 314 and the square of the signal received from the LPF 315, finding the sum of the squares. The sum output by the correlation detector 316 represents a correlation value (CV) L between the IF data and the late PN code L generated by the PN-code generator 320. The correlation value (CV) L is delivered to the phase detector 321 and the CPU 26 by way of the control register 43.

The phase detector 321 finds a difference between the correlation value (CV) E received from the correlation detector 306 and the correlation value (CV) L received from the correlation detector 316 and uses this difference as a detected difference in phase between the prompt PN code P and the satellite PN code of the signal transmitted by the GPS satellite. The phase detector 321 then supplies a signal representing this difference in phase to an NCO (Numerical Controlled Oscillator) 323 by way of a loop filter 322 as a numerical control signal.

The PN-code generator 320 also receives a signal from the NCO 323. By adjusting the frequency of the signal supplied by the NCO 323 to the PN-code generator 320, the phase of the PN code generated by the PN-code generator 320 can be controlled.

It is to be noted that, as will be described later, the NCO 323 receives a frequency for controlling an initial oscillation frequency from the CPU 26 a frequency according to a result of processing carried out by the synchronization-capturing section 24 to capture synchronization.

By execution of the loop control in the DLL 42 described above, the NCO 323 is controlled to adjust the phases of the PN codes P, E and L generated by the PN-code generator 320 so that the correlation value (CV) E has the same level as the correlation value (CV) L. Thus, the phase of the prompt PN code P generated by the PN-code generator 320 is synchronized with the phase of the satellite PN code, the IF data of which has completed a spectrum-spreading process. As a result, by virtue of the prompt PN code P, the IF data can be subjected to a spectrum inverse spreading process correctly so that the costas loop 41 is capable of demodulating data of a navigation message received from the binary-conversion circuit 210.

Then, the result of the processing to modulate the data of the navigation message is supplied to a data demodulation circuit not shown in the figure. After being further demodulated in the data demodulation circuit into data usable by the CPU 26, the usable data is supplied to the CPU 26. The CPU 26 uses the data of the navigation message in computation of a position. In addition, the CPU 26 extracts locus information including an almanac and an ephemeris from the data of the navigation message, supplying the information to the memory 29.

It is to be noted that, in accordance with a parameter received from the CPU 26, the loop filter 322 employed in the DLL 42 integrates the phase error received from the phase detector 321 to generate an NCO control signal for controlling the NCO 323 as the loop filter 207 employed in the costas loop 41 does.

Also in the DLL 42, a switch circuit 324 for controlling operations to open and close the loop is provided between the loop filter 322 and the NCO 323. The switch circuit 324 is opened and closed in accordance with a switching control signal generated by the CPU 26.

It is to be noted that, in an initial state prior to the start of a synchronization sustenance operation, the switch circuit 324 is in a turned-off state, putting the loop in an opened state. As will be described later, when the synchronization sustenance operation is started, putting the correlation output of the correlation detector 209 employed in the costas loop 41 at a meaningful level, the switch circuit 324 is turned on to put the loop in a closed state.

[Operations to Compute a Position and a Velocity]

In the GPS receiver 10 having the configuration described above, RF signals are received from at least 4 GPS satellites. After each of the RF signals is converted into an IF signal in the frequency conversion section 23, the synchronization-capturing section 24 captures synchronization of a spreading code of the IF signal and detects the frequency of the carrier. Then, the synchronization sustenance section 25 sustains the synchronization of the spreading code with the carrier and demodulates a navigation message.

Then, in the GPS receiver 10, the CPU 26 computes the 3-dimensional position and 3-dimensional velocity of the GPS receiver 10 on the basis of the phases of each spreading code, the frequency of each carrier and each navigation message.

Prior to the computations of the 3-dimensional position and 3-dimensional velocity of the GPS receiver 10, the GPS receiver 10 determines a group of satellites necessary for the computations of the 3-dimensional position and 3-dimensional velocity of the GPS receiver 10 and uses signals received from the satellites of the determined group to find a precision error to be used as a criterion of determination as to whether or not to carry out the computations of the 3-dimensional position and 3-dimensional velocity of the GPS receiver 10. That is to say, if the found precision error is found smaller than a required precision error, the amplifier 20 computes the 3-dimensional position and 3-dimensional velocity of its own.

Unlike the conventional GPS receiver, in this embodiment, a set P of satellites used for computing the position of the GPS receiver 10 is determined separately from a determined set V of satellites used for computing the velocity of the GPS receiver 10.

That is to say, a set P of satellites used for computing the position of the GPS receiver 10 is determined as a set consisting of satellites each satisfying the following computable-position conditions:

(a): its locus is already known; and (b): the time of a transmission of its spreading code is already known.

On the other hand, a set V of satellites used for computing the velocity of the GPS receiver 10 is determined as a set consisting of satellites each satisfying the following computable-velocity conditions:

(a): its locus is already known; and (c): the frequency of its carrier is already known as a stable frequency.

In addition, in this embodiment, all satellites pertaining to a set P consisting of satellites each satisfying the computable-position conditions are used for computing the position of the GPS receiver 10. Thus, in this embodiment, at least, the position of the GPS receiver 10 can be computed even if a relation of |V|<3 holds true where notation |V| denotes the number of satellites pertaining to a set V consisting of satellites each satisfying the computable-velocity conditions.

That is to say, even in a situation where a position cannot be computed by using the conventional receiver, the GPS receiver 10 is capable of computing the position, contributing to the improvement of the positioning rate. In addition, since it is quite within the bounds of possibility that the number of satellites used for computing the position of the GPS receiver 10 is greater than that for the conventional receiver, that is, it is quite within the bounds of possibility that a relation of (|P|≧|P∩V|) holds true, the GPS receiver 10 according to the embodiment also contributes to the improvement of the precision of the position computation.

By the way, in actuality, a GPS receiver does not always compute a position and a velocity, outputting results of the computations only because the number of satellites satisfying the computable-position and computable-velocity conditions is 4 or greater. That is to say, in order to prevent the precision of the positioning from deteriorating, the GPS receiver internally makes a decision not to compute a position if a computation error is expected to be large due to a geometrical layout of satellites. In this case, as a precision indicator, the DOP (Dilution of Precision) is used.

Then, in a GPS receiver, if a found DOP becomes greater than a DOP threshold value determined in advance, an expected computation error is regarded as a large error. In this case, a position is not computed. The value of the DOP is determined from a layout of satellites with respect to the GPS receiver. In addition, the DOP displays a property showing a tendency to decrease with a sequentially raised number of satellites.

It is to be noted that the DOP may be defined for example as a GDOP (Geometrical DOP) or a PDOP (Position DOP), which each has a geometrical meaning. The GDOP is a DOP seasoned with a 3-dimensional position and a time. On the other hand, the PDOP is a DOP seasoned with only a 3-dimensional position.

The value of a PDOP can found typically as follows. First of all, on the basis of positional coordinates of each satellite used in computation of a position and positional coordinates of the GPS receiver, a matrix A like one expressed by Eq. (1) shown in FIG. 9 is determined.

Then, as shown in FIG. 9, a matrix B is determined as the inverse matrix of a product of the matrix A and the transposed matrix of the matrix A. With the diagonal elements of the matrix B determined as expressed by Eqs. (2) to (5) shown in FIG. 9, the value of the PDOP can be found as expressed by Eq. (6) shown in FIG. 9.

In this embodiment, as described earlier, 2 types of DOP are computed because the set P of satellites used for computing a position is different from the set V of satellites used for computing a velocity. The 2 types of DOP are a position DOP related to satellites used for computing a position and a velocity DOP related to satellites used for computing a velocity. In this case, both the position DOP and the velocity DOP are each a PDOP shown in FIG. 9 as described above. However, the set P of satellites used for computing a position is different from the set V of satellites used for computing a velocity.

In addition, let us assume that a set P is a set of satellites each satisfying the computable-position conditions and a set V is a set of satellites each satisfying the computable-velocity conditions as described earlier. In this case, let us assume that the set P is a set of satellites used for computing the position of the GPS receiver 10 and a set P∩V is a set of satellites used for computing the velocity of the GPS receiver 10. Since a relation of |P|≧|P∩V| holds true, a relation of $D_p \leq D_v$ holds true where notations $D_p$ and $D_v$ denote the position DOP and the velocity DOP respectively. This is because, in the case of the position DOP, the number of satellites used for computing a position is larger than the number of satellites used for computing a velocity.

Traditionally, a relation of $D_p = D_v$ always holds true. As the threshold value of the DOP, a threshold value L common to the position DOP and the velocity DOP is used.

In a situation where the relation of $D_p \leq D_v$ holds true as is the case with this embodiment, on the other hand, if a relation of $D_v \leq L$ holds true, a relation of $D_p < L$ always holds true. Thus, the position and velocity of the GPS receiver 10 can be obtained with their positioning precision guaranteed to a certain degree.

On the other hand, a relation of $D_p \leq L < D_v$ holding true means that the position of the GPS receiver 10 can be obtained with its positioning precision guaranteed to a certain degree but the velocity of the GPS receiver 10 can be obtained with its positioning precision not guaranteed. Within the bounds satisfied by the relation above, only the position of the GPS receiver 10 can be computed.

In this case, if conditions for precision of computation of only the position of the GPS receiver 10 are eased, the number of chances that only the position of the GPS receiver 10 is calculated can be increased while the precision of positioning to compute both the position and velocity of the GPS receiver 10 is maintained as it is. Thus, even in a situation wherein a receiver position cannot be found by using the conventional receiver only because the layout of satellites is poor so that the position DOP is large (that is, the relation of $D_p > L$ holds true), an approximate position of the GPS receiver 10 can be obtained.

In order to ease the conditions for precision of computation of only the position of the GPS receiver 10, in this embodiment, a DOP threshold value for the position DOP is set at a value different from the DOP threshold value for the velocity DOP. To be more specific, the DOP threshold value $L_p$ for the position DOP is at a value at least equal to the DOP threshold value $L_v$ for the velocity DOP so as to satisfy a relation of $L_p \geq L_v = L$.

As described above, if a relation of $D_v \leq L_v$ holds true, since a relation of $D_p \leq L_v \leq L_p$ holds true, the positioning precision of the position and velocity of the GPS receiver 10 can be held at approximately the conventional level.

If relations of $D_v > L_v$ and $D_p \leq L_p$ hold true, on the other hand, the velocity of the GPS receiver 10 is not computed because the precision of the velocity of the GPS receiver 10 is poor. As for the position of the GPS receiver 10, the positioning precision is expected to have a value in a range determined by the threshold value $L_p$ for the position DOP. Thus, an approximate position of the GPS receiver 10 is output to an external recipient. Thus, in this embodiment, even in a situation wherein a receiver velocity cannot be found by using the conventional receiver only because the situation is a non-positioning situation, the user can be notified of an approximate position of the GPS receiver 10.

Figure 10:
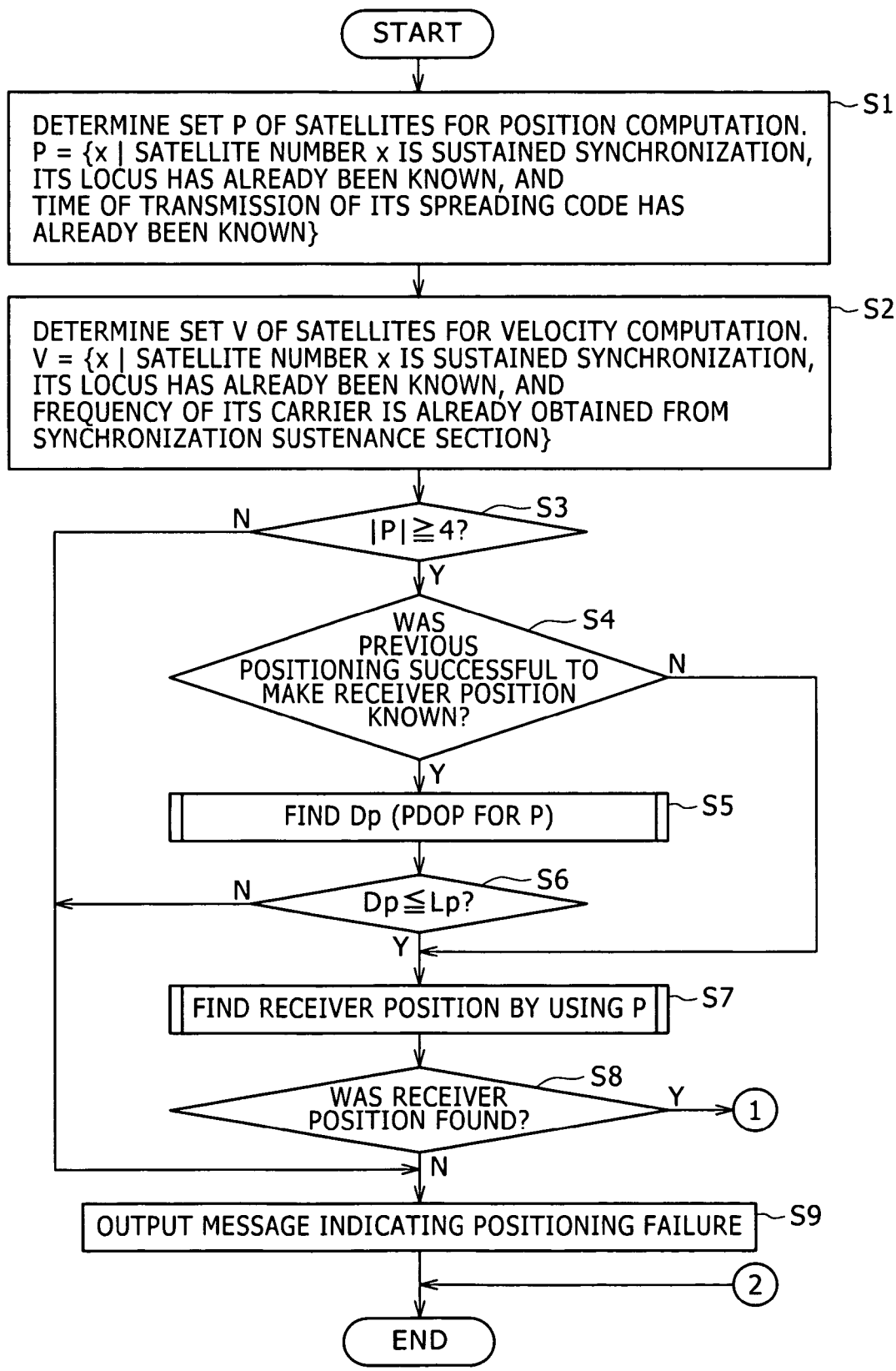
FIG. 10 shows a flowchart referred to in description of operations carried out by principal sections employed in the GPS receiver shown in FIG. 2.
Figure 11:
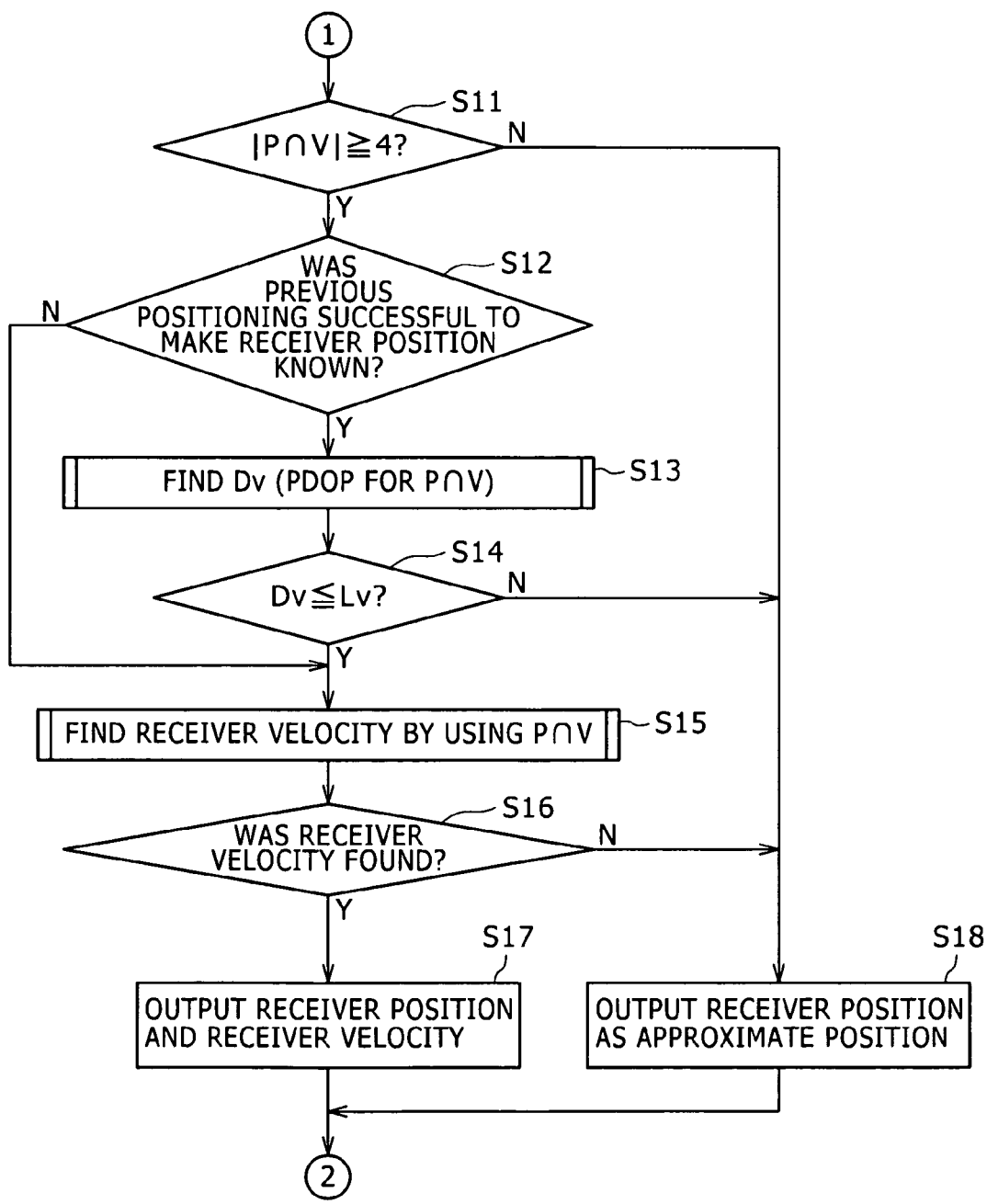
FIG. 11 shows another flowchart referred to in description of operations carried out by principal sections employed in the GPS receiver shown in FIG. 2.

By referring to flowcharts shown in FIGS. 10 and 11, the following description explains a procedure from the process to determine satellites required for computing the position and velocity of the GPS receiver 10 as described above to a process to actually execute the computations of the position and velocity of the GPS receiver 10 or a process to make a decision to cancel the computations. The procedure is referred to hereafter as a positioning execution determination processing procedure.

First of all, at a step S1 of the flowchart shown in FIG. 10, the CPU 26 searches a plurality of satellites, synchronizations for each of which have been sustained by the synchronization sustenance section 25, for a set of satellites each satisfying the following conditions:

(a): its locus is already known; and
(b): the time of a transmission of its spreading code is already known.

The set of satellites found in the search is referred to a set P of satellites used for computing a position. The statement saying "its locus is already known" as one of the above conditions implies that, if the locus of the satellite of interest has been stored in the memory 29, the satellite is regarded as a satellite satisfying this condition.

Then, at the next step S2, the CPU 26 searches a plurality of satellites, synchronizations for each of which have been sustained by the synchronization sustenance section 25, for a set of satellites each satisfying the following conditions:

(a): its locus is already known; and
(c): the frequency of its carrier has already been obtained from the synchronization sustenance section 25, that is, the frequency of the carrier is already known as a stable frequency.

The set of satellites found in the search is referred to a set V of satellites used for computing a velocity.

Then, at the next step S3, the CPU 26 determines whether or not the number of satellites pertaining to the set P is at least equal to 4. If the number of satellites pertaining to the set P is found smaller than 4, a 3-dimensional position is determined to be incomputable. In the case of this embodiment, the flow of the procedure goes on to a step S9 at which the CPU 26 generates an output signal revealing a failure of the positioning process.

If the number of satellites pertaining to the set P is found at least equal to 4 at the step S3, on the other hand, a 3-dimensional position is determined to be a computable quantity. In order to determine whether or not to actually carry out the positioning process, however, a position DOP serving as an indicator of the computation error is found as described earlier. Then, the position DOP is compared with a threshold value $L_p$ stored in the memory 29 as a threshold value determined in advance for the position DOP in order to determine whether or not to actually carry out the positioning process.

In this case, as described earlier, in order to find a position DOP, an approximate position of the GPS receiver 10 and positions of all satellites to be used in computations are required. As the approximate position of the GPS receiver 10, a position stored in the memory 29 as a position found in a previous positioning process is used.

If the number of satellites pertaining to the set P is found at least equal to 4 at the step S3, the flow of the procedure goes on to a step S4 at which the CPU 26 produces a result of determination as to whether or not the previous positioning process has been carried out successfully and a position computed in the previous positioning process has been stored in the memory 29 as the position of the GPS receiver 10, that is, whether or not the position of the GPS receiver 10 has already been known. If the determination result produced at the step S4 indicates that the position of the GPS receiver 10 has already been known, the flow of the procedure goes on to a step S5 at which the CPU 26 finds $D_p$ (that is, PDOP or the position DOP for the set P) by using the formulas described earlier by referring to FIG. 9. Then, at the next step S6, the CPU 26 compares $D_p$ with a threshold value $L_p$ stored in the memory 29 as the threshold value for $D_p$. That is to say, the CPU 26 produces a result of determination as to whether or not a relation of $D_p \leq L_p$ holds true.

If the determination result produced at the step S6 indicates that a relation of $D_p > L_p$ holds true, the CPU 26 makes a decision to cancel the computation of a 3-dimensional position because the computation error is predicted to be a large error. In this case, the flow of the procedure goes on to the step S9 at which the CPU 26 generates an output signal revealing a failure of the positioning process.

If the determination result produced at the step S6 indicates that the relation of $D_p \leq L_p$ holds true, on the other hand, the flow of the procedure goes on to a step S7 at which the 3-dimensional position of the GPS receiver 10 is computed by using the satellites pertaining to the set P. If the determination result produced at the step S4 indicates that the approximate position of the GPS receiver 10 is not known because the position of the GPS receiver 10 has not been stored in the memory 29, on the other hand, the position DOP cannot be computed. In this case, the flow of the procedure also goes on to the step S7 at which the 3-dimensional position of the GPS receiver 10 is computed.

Then, at the next step S8, the CPU 26 determines whether or not the 3-dimensional position of the GPS receiver 10 has actually been found in the process to compute the position. If the 3-dimensional position of the GPS receiver 10 cannot been found due to, for example, the fact that the process to compute the position is not converged to a final solution, at the step S8, the CPU 26 produces a determination result indicating that the 3-dimensional position of the GPS receiver 10 cannot been found. In this case, the process to find the 3-dimensional position of the GPS receiver 10 is discontinued and the flow of the procedure goes on to the step S9 at which the CPU 26 generates an output signal revealing a failure of the positioning process. After the process carried out at the step S9 is completed, the execution of the positioning processing represented by this flowchart is ended.

If the CPU 26 produces a result of determination at the step S8 as a determination result indicating that the 3-dimensional position of the GPS receiver 10 has been computed successfully, on the other hand, the flow of the procedure goes on to a step S11 of the flowchart shown in FIG. 11 at which the CPU 26 makes an attempt to carry out processing to compute the 3-dimensional velocity of the GPS receiver 10. The processing to compute the 3-dimensional velocity of the GPS receiver 10 begins with a process to produce a result of determination as to whether or not the number of satellites usable in computation of a velocity is at least equal to 4, that is, whether or not the number of elements pertaining to a set of P∩V is at least equal to 4.

If the determination result produced at the step S11 indicates that the number of elements pertaining to the set of P∩V is smaller than 4, the flow of the procedure goes on to a step S18 at which the receiver position computed at the step S7 is output as an approximate position of the GPS receiver 10. That is to say, since the velocity of the GPS receiver 10 cannot be computed, only an approximate position of the GPS receiver 10 is output. At that time, the approximate position of the GPS receiver 10 may be output along with additional information such as a flag indicating that the output positional information is merely the approximate position of the GPS receiver 10. After the process carried out at the step S18 is completed, the execution of the positioning processing represented by this flowchart is ended.

If the determination result produced at the step S11 indicates that the number of elements pertaining to the set of P∩V is at least equal to 4, on the other hand, the 3-dimensional velocity of the GPS receiver 10 is determined to be a computable quantity. Much like the computation of a position, in order to determine whether or not to actually carry out the process to compute the 3-dimensional velocity of the GPS receiver 10, however, a velocity DOP serving as an indicator of the magnitude of a computation error is found. Then, the velocity DOP is compared with a threshold value $L_v$ stored in the memory 29 as a threshold value determined in advance for the velocity DOP in order to determine whether or not to actually carry out the process to compute the 3-dimensional velocity of the GPS receiver 10.

In this case, as described earlier, in order to find a velocity DOP, an approximate position of the GPS receiver 10 and positions of all satellites to be used in computations are required. As the approximate position of the GPS receiver 10, a position stored in the memory 29 as a position found in a previous positioning process is used. From the conditions for the set of P∩V, the position of each satellite can also be found.

If the number of satellites pertaining to the set of P∩V is found at least equal to 4 at the step S11, the flow of the procedure goes on to a step S12 at which the CPU 26 produces a result of determination as to whether or not the previous positioning process has been carried out successfully and a position computed in the previous positioning process has been stored in the memory 29 as the position of the GPS receiver 10, that is, whether or not the position of the GPS receiver 10 has already been known. If the determination result produced at the step S12 indicates that the position of the GPS receiver 10 has already been known, the flow of the procedure goes on to a step S13 at which the CPU 26 finds $D_v$ (that is, PDOP or the velocity DOP for the set V) by using the formulas described earlier by referring to FIG. 9. Then, at the next step S14, the CPU 26 compares $D_v$ with a threshold value $L_v$ stored in the memory 29 as the threshold value for $D_v$. That is to say, the CPU 26 produces a result of determination as to whether or not a relation of $D_v \leq L_v$ holds true.

If the determination result produced at the step S14 indicates that a relation of $D_v > L_v$ holds true, the CPU 26 makes a decision to cancel the computation of a 3-dimensional velocity because the computation error is predicted to be a large error. In this case, the flow of the procedure goes on to the step S18 at which the receiver position computed at the step S7 is output as an approximate position of the GPS receiver 10.

If the determination result produced at the step S14 indicates that the relation of $D_v \leq L_v$ holds true, on the other hand, the flow of the procedure goes on to a step S15 at which the 3-dimensional velocity of the GPS receiver 10 is computed by using the satellites pertaining to the set V. If the determination result produced at the step S12 indicates that the approximate position of the GPS receiver 10 is not known because the position of the GPS receiver 10 has not been stored in the memory 29, on the other hand, the velocity DOP cannot be computed. In this case, the flow of the procedure also goes on to the step S15 at which the 3-dimensional velocity of the GPS receiver 10 is computed.

Then, at the next step S16, the CPU 26 determines whether or not the 3-dimensional velocity of the GPS receiver 10 has actually been found in the process to compute the velocity. If the 3-dimensional velocity of the GPS receiver 10 cannot been found due to, for example, the fact that the process to compute the velocity is not converged to a final solution, at the step S16, the CPU 26 produces a determination result indicating that the 3-dimensional velocity of the GPS receiver 10 cannot been found. In this case, the process to find the 3-dimensional velocity of the GPS receiver 10 is discontinued and the flow of the procedure goes on to the step S18 at which the receiver position computed at the step S7 is output as an approximate position of the GPS receiver 10. After the process carried out at the step S18 is completed, the execution of the positioning processing represented by this flowchart is ended.

If the CPU 26 produces a result of determination at the step S16 as a determination result indicating that the 3-dimensional velocity of the GPS receiver 10 has been computed successfully, on the other hand, the flow of the procedure goes on to a step S17 at which the receiver position computed at the step S7 as the 3-dimensional position of the GPS receiver 10 and the receiver velocity computed at the step S15 as the 3 dimensional velocity of the GPS receiver 10 are output. After the process carried out at the step S17 is completed, the execution of the positioning processing represented by this flowchart is ended.

As a result of the processing carried out by execution of the positioning routine described above, the following 3 cases can be assumed.

Case (1): The position and velocity of the GPS receiver 10 are both found.

Case (2): Only the position of the GPS receiver 10 is found.

Case (3): Neither the position nor the velocity of the GPS receiver 10 is found.

In case (1), the CPU 26 stores the computed position and velocity of the GPS receiver 10 in the memory 29, outputting these pieces of information as results of positioning to an external recipient by way of an I/O section.

In case (2), the CPU 26 stores only the computed position of the GPS receiver 10 in the memory 29 as an approximate position and outputs this approximate position of the GPS receiver 10 as a result of positioning to an external recipient by way of the I/O section. Then, as for the velocity of the GPS receiver 10, the GPS receiver stores information indicating a failure of the processing to compute the position and velocity of the GPS receiver 10 in the memory 29, outputting the information to an external recipient.

In case (3), the CPU 26 stores information indicating a failure of the processing to compute the position and velocity of the GPS receiver 10 in the memory 29, outputting the information to an external recipient by way of the I/O section.

As described above, in accordance with the GPS receiver 10 according to this embodiment, in a situation wherein the conventional receiver is not capable of computing its position and velocity, the GPS receiver 10 exhibits an effect of an ability to compute the position of the GPS receiver 10 as a contribution to the improvement of the position-computation rate. In addition, the GPS receiver 10 also contributes to the shortening of a TTFF (Time To First Fix), which is a time lapsing since an operation to turn on the power supply of the GPS receiver 10 till the positioning process is completed successfully for the first time.

Other Embodiments

In the embodiment described above, after a set P of satellites used for computing the position of a receiver and a set V of satellites used for computing the velocity of the receiver are found among satellites each having its synchronization sustained by the receiver, a position DOP and a velocity DOP are computed for the sets P and V respectively. However, it is also possible to determine whether or not to compute the position and/or velocity of a receiver by using the threshold value $L_p$ of the position DOP and the threshold value $L_v$ of the velocity DOP without finding the sets P and V, wherein the threshold value $L_p$ is different from the threshold value $L_v$, typically satisfying a relation of $L_v < L_p$.

That is to say, if 4 or more satellites each having its synchronizations sustained exist, a DOP such as the PDOP (the position DOP) for the satellites to be used in a positioning process is found. Then, the found PDOP is compared with a set threshold value $L_p$ of the position DOP and a threshold value $L_v$, which is set differently from the threshold value $L_p$ as the threshold value $L_v$ of the velocity DOP. If the PDOP is found equal to or smaller than the threshold value $L_p$ of the position DOP, the process to compute the position of the receiver is carried out. If the PDOP is found equal to or smaller than the threshold value $L_v$ of the velocity DOP, the process to compute the velocity of the receiver is carried out. Even in the case of such an embodiment, the same effect as that described above can be obtained.

In addition, in the embodiment described earlier, the threshold value $L_p$ of the position DOP is eased in comparison with the threshold value L of the conventional DOP to satisfy a relation of $L_p > L$. However, the threshold value $L_v$ of the velocity DOP can also be eased in comparison with the threshold value L of the conventional DOP to satisfy a relation of $L_v > L$.

As a precision indicator in the embodiment described before, a DOP is used. It is to be noted that an indicator obtained by adding an element condition to the DOP or another indicator can also be used.

In addition, in the embodiment described before, a result output by the synchronization-capturing section 24 is supplied to the synchronization sustenance section 25 by way of the CPU 26. However, it is also possible to provide a configuration in which the result output by the synchronization-capturing section 24 is supplied to the synchronization sustenance section 25 directly.

On the top of that, the synchronization-capturing section 24 employed in the embodiment described before uses a digital matched filter. However, the synchronization-capturing section 24 is not limited to the typical configuration using a digital matched filter. This is because it is an object of the present invention to provide a receiver in which a synchronization-capturing section captures synchronization with a relatively low degree of precision and delivers a result to a synchronization sustenance section in order to increase the speed of a process to establish the synchronization.

Furthermore, the digital matched filter is not limited to the typical configuration making use of the FFT process as described earlier. As described before, it is also possible to use a configuration utilizing a transversal filter.

Moreover, neither the synchronization-capturing section nor the synchronization sustenance section is limited to the typical configuration described before. That is to say, the synchronization-capturing section and the synchronization sustenance section can have any configuration as long as, in the configuration, functions of the synchronization-capturing section and the synchronization sustenance section can be carried out.

In addition, the scope of the present invention is not limited to a GPS receiver having a typical configuration divided into the synchronization-capturing section and the synchronization sustenance section. For example, the present invention can also be applied to a GPS receiver in which, by virtue of a sliding correlation, synchronization is detected for each carrier and each spreading code and, at the same time, the DLL and the costas loop carry out operations to capture and sustain the synchronization.

On the top of that, the satellite-signal reception-processing apparatus according to the embodiment of the present invention is not limited to the receiver provided for the GPS system. For example, the present invention can also be applied to a receiver provided for the GLONASS system built by former Soviet Union and a receiver provided for the GALILEO system, the construction of which is carried forward by countries led by European countries.

In addition, it should be understood by those skilled in the art that a variety of modifications, combinations, sub-combinations and alterations may occur in dependence on design requirements and other factors insofar as they are within the scope of the appended claims or the equivalents thereof.

What is claimed is:

1. A satellite-signal reception-processing apparatus for receiving signals, which each have completed a spectrum-spreading process using a spreading code, from a plurality of artificial satellites, and computing a position and velocity of said satellite-signal reception-processing apparatus on the basis of said received signals, said satellite-signal reception-processing apparatus comprising:

position-computation satellite determination means for carrying out an operation to search said artificial satellites for a set of specific artificial satellites each having its locus already known and a time of transmission of its spreading code also already known, a frequency of its carrier not being known as a stable frequency and designating said set found in said search operation as a set of position-computation artificial satellites to be used in computation of a position of said satellite-signal reception-processing apparatus; and velocity-computation satellite determination means for carrying out an operation to search said artificial satellites for a set of particular artificial satellites each having its locus already known and a frequency of its carrier determined to be a stable frequency, a time of transmission of its spreading code not known and designating said set found in said search operation as a set of velocity-computation artificial satellites to be used in computation of a velocity of said satellite-signal reception-processing apparatus.

2. A satellite-signal reception-processing apparatus according to claim 1, wherein said position-computation satellite determination means carries out an operation to search said artificial satellites each transmitting said signal, said spreading code and the frequency of said carrier of which have their synchronizations sustained, for said set of position-computation artificial satellites; and wherein said velocity-computation satellite determination means carries out an operation to search said artificial satellites each transmitting said signal, said spreading code and the frequency of said carrier of which have their synchronizations sustained, for said set of velocity-computation artificial satellites.

3. A satellite-signal reception-processing apparatus according to claim 1,
wherein a position of said satellite-signal reception-processing apparatus is computed only if a precision indicator determined by a layout of said position-computation artificial satellites is equal to or smaller than a position-precision indicator threshold value determined in advance; and
wherein a velocity of said satellite-signal reception-processing apparatus is computed only if a precision indicator determined by a layout of said velocity-computation artificial satellites is equal to or smaller than a velocity-precision indicator threshold value determined in advance independently of said position-precision indicator threshold value.

4. A satellite-signal reception-processing apparatus according to claim 3,
wherein said velocity-precision indicator threshold value is a first DOP (Dilution Of Precision), and
wherein said position-precision indicator threshold value is a second DOP (Dilution Of Precision).

5. A satellite-signal reception-processing apparatus for receiving signals from a plurality of artificial satellites for computation of a position and velocity of said satellite-signal reception-processing apparatus as signals, which each have completed a spectrum-spreading process using a spreading code of said artificial satellite, and computing a position and velocity of said satellite-signal reception-processing apparatus on the basis of said received signals, said satellite-signal reception-processing apparatus comprising:
position-computation satellite determination means for searching said artificial satellites for a set of specific artificial satellites each transmitting said signal, said spreading code and the frequency of the carrier of which have their synchronizations sustained, searching said set of specific artificial satellites for final artificial satellites whose precision indicator determined by a layout of said artificial satellites used for computation of a position of said satellite-signal reception-processing apparatus is equal to or smaller than a position-precision indicator threshold value determined in advance and computing of a position of said satellite-signal reception-processing apparatus; and
velocity-computation satellite determination means for searching said artificial satellites for a set of particular artificial satellites each transmitting said signal, said spreading code and the frequency of the carrier of which have their synchronizations sustained, searching said set of particular artificial satellites for eventual artificial satellites whose precision indicator determined by a layout of said artificial satellites used for computation of a velocity of said satellite-signal reception-processing apparatus is equal to or smaller than a velocity-precision indicator threshold value determined in advance independently of said position-precision indicator threshold value and computing of a velocity of said satellite-signal reception-processing apparatus.

6. A satellite-signal reception-processing apparatus according to claim 5,
wherein said velocity-precision indicator threshold value is a first DOP (Dilution Of Precision), and
wherein said position-precision indicator threshold value is a second DOP (Dilution Of Precision).

7. A satellite-signal reception-processing method for receiving signals from a plurality of artificial satellites as signals, which each have completed a spectrum-spreading process using a spreading code of said artificial satellite, and computing a position and velocity of an apparatus adopting said satellite-signal reception-processing method on the basis of said received signals, said satellite-signal reception-processing method comprising the steps of:
determining a position-computation satellite for carrying out an operation to search said artificial satellites for a set of specific artificial satellites each having its locus already known and a time of transmission of its spreading code also already known, a frequency of its carrier not being known as a stable frequency and designating said set found in said search operation as a set of position-computation artificial satellites to be used in computation of a position of said apparatus adopting said satellite-signal reception-processing method;
determining velocity-computation satellite for carrying out an operation to search said artificial satellites for a set of particular artificial satellites each having its locus already known and a frequency of its carrier determined to be a stable frequency, a time of transmission of its spreading code not known and designating said set found in said search operation as a set of velocity-computation artificial satellites to be used in computation of a velocity of said apparatus adopting said satellite-signal reception-processing method; and
outputting the determined position and the determined velocity of the apparatus for further application.

8. A satellite-signal reception-processing method according to claim 7,
wherein said position-computation satellite determination process is carried out to search said artificial satellites each transmitting said signal, said spreading code and the frequency of said carrier of which have their synchronizations sustained, for said set of position-computation artificial satellites; and
wherein said velocity-computation satellite determination process is carried out to search said artificial satellites each transmitting said signal, said spreading code and the frequency of said carrier of which have their synchronizations sustained, for said set of velocity-computation artificial satellites.

9. A satellite-signal reception-processing method according to claim 7,
wherein a position of said satellite-signal reception-processing apparatus is computed only if a precision indicator determined by a layout of said position-computation artificial satellites is equal to or smaller than a position-precision indicator threshold value determined in advance; and
wherein a velocity of said satellite-signal reception-processing apparatus is computed only if a precision indicator determined by a layout of said velocity-computation artificial satellites is equal to or smaller than a velocity-precision indicator threshold value determined in advance independently of said position-precision indicator threshold value.

10. A satellite-signal reception-processing method according to claim 9,
wherein said velocity-precision indicator threshold value is a first DOP (Dilution Of Precision), and
wherein said position-precision indicator threshold value is a second DOP (Dilution of Precision).

11. An artificial-satellite signal reception method comprising the steps of:
computing a position of an apparatus adopting said artificial-satellite signal reception method by using signals received from a plurality of artificial satellites for which a position precision indicator is equal to or smaller than a position-precision indicator threshold value determined in advance where said position precision indicator is an indicator determined by a layout of artificial satellites used for computing a position of said apparatus;

computing a velocity of said apparatus by using signals received from a plurality of artificial satellites for which a velocity precision indicator is equal to or smaller than a velocity-precision indicator threshold value determined in advance independently of said position-precision indicator threshold value where said velocity precision indicator is an indicator determined by a layout of artificial satellites used for computing a velocity of said apparatus; and outputting the determined position and the determined velocity of the apparatus for further application.

12. An artificial-satellite signal reception method according to claim 11,
wherein said velocity-precision indicator threshold value is a first DOP (Dilution Of Precision), and
wherein said position-precision indicator threshold value is a second DOP (Dilution of Precision).

13. A satellite-signal reception-processing apparatus for receiving signals from a plurality of artificial satellites as signals, which each have completed a spectrum-spreading process using a spreading code of said artificial satellite, and computing a position and velocity of said satellite-signal reception-processing apparatus on the basis of said received signals, said satellite-signal reception-processing apparatus comprising:

a position-computation satellite determination unit for carrying out an operation to search said artificial satellites for a set of specific artificial satellites each having its locus already known and a time of transmission of its spreading code also already known, a frequency of its carrier not being known as a stable frequency and designating said set found in said search operation as a set of position-computation artificial satellites to be used in computation of a position of said satellite-signal reception-processing apparatus; and a velocity-computation satellite determination unit for carrying out an operation to search said artificial satellites for a set of particular artificial satellites each having its locus already known and a frequency of its carrier determined to be a stable frequency, a time of transmission of its spreading code not known and designating said set found in said search operation as a set of velocity-computation artificial satellites to be used in computation of a velocity of said satellite-signal reception-processing apparatus.

* * * * *